(12) United States Patent
Lert, Jr. et al.

(10) Patent No.: US 10,919,701 B2
(45) Date of Patent: Feb. 16, 2021

(54) INTERCHANGEABLE AUTOMATED MOBILE ROBOTS WITH A PLURALITY OF OPERATING MODES CONFIGURING A PLURALITY OF DIFFERENT ROBOT TASK CAPABILITIES

(71) Applicant: ALERT INNOVATION INC., North Billerica, MA (US)

(72) Inventors: John G. Lert, Jr., Wakefield, MA (US); William J. Fosnight, Windham, NH (US); Matthew W. Coady, Hollis, NH (US)

(73) Assignee: Alert Innovation Inc., North Billerica, MA (US)

( * ) Notice: Subject to any disclaimer, the term of this patent is extended or adjusted under 35 U.S.C. 154(b) by 0 days.

(21) Appl. No.: 15/867,373

(22) Filed: Jan. 10, 2018

(65) Prior Publication Data
US 2018/0194556 A1    Jul. 12, 2018

Related U.S. Application Data

(60) Provisional application No. 62/444,693, filed on Jan. 10, 2017.

(51) Int. Cl.
*B65G 1/00* (2006.01)
*B65G 1/137* (2006.01)
(Continued)

(52) U.S. Cl.
CPC ......... *B65G 1/1378* (2013.01); *B65G 1/0492* (2013.01); *G06Q 10/087* (2013.01)

(58) Field of Classification Search
CPC ............................ B65G 1/1378; B65G 1/1373
See application file for complete search history.

(56) References Cited

U.S. PATENT DOCUMENTS

| 4,221,076 A | 9/1980 | Ozawa |
| 5,179,329 A | 1/1993 | Nishikawa et al. |

(Continued)

FOREIGN PATENT DOCUMENTS

| DE | 3624033 | 8/1987 |
| DE | 102012100354 | 7/2013 |

(Continued)

OTHER PUBLICATIONS

Notice of Allowance and Fee(s) Due dated Jan. 29, 2019 in U.S. Appl. No. 15/171,802.

(Continued)

*Primary Examiner* — Timothy R Waggoner
(74) *Attorney, Agent, or Firm* — Vierra Magen Marcus LLP

(57) ABSTRACT

A system and method for managing a plurality of automated mobile robots within automated mobile robot storage and retrieval system is provided, which repurposes one or more automated mobile robots operating within the automated inventory management system to perform a plurality of tasks across multiple different areas of an automated store. The same mobile robot is enabled to move horizontally and vertically in a multi-level storage structure, operate in an order fulfillment mode retrieving order totes from an automated fulfillment section and delivering the order totes to the delivery section, operate in a replenishment mode receiving eaches of goods and depositing the eaches of goods in designated storage totes, and operate in a delivery mode receiving delivery bundles and transporting the delivery bundles to designated locations at the transfer station.

30 Claims, 19 Drawing Sheets

(51) Int. Cl.
*G06Q 10/08* (2012.01)
*B65G 1/04* (2006.01)

(56) References Cited

U.S. PATENT DOCUMENTS

| | | | |
|---|---|---|---|
| 5,433,293 A | 7/1995 | Sager | |
| 5,472,309 A | 12/1995 | Bernard et al. | |
| 5,501,295 A | 3/1996 | Muller et al. | |
| 5,551,823 A | 9/1996 | Maruyama | |
| 5,595,264 A | 1/1997 | Trotta, Jr. | |
| 5,636,966 A | 6/1997 | Lyon et al. | |
| 5,642,976 A | 7/1997 | Konstant | |
| 5,890,136 A | 3/1999 | Kipp | |
| 5,953,234 A | 9/1999 | Singer et al. | |
| 5,996,316 A | 12/1999 | Kirschner | |
| 6,289,260 B1 | 9/2001 | Bradley et al. | |
| 6,494,313 B1 | 12/2002 | Trescott | |
| 6,539,876 B1 | 4/2003 | Campbell et al. | |
| 6,671,580 B2 | 12/2003 | Campbell et al. | |
| 6,729,836 B2 | 5/2004 | Stingel, III et al. | |
| 6,744,436 B1 | 6/2004 | Chirieleison, Jr. et al. | |
| 6,805,526 B2 | 10/2004 | Stefani | |
| 7,054,832 B2 | 5/2006 | Vallabh | |
| 7,101,139 B1 | 9/2006 | Benedict | |
| 7,110,855 B2 | 9/2006 | Leishman | |
| 7,139,637 B1 | 11/2006 | Waddington et al. | |
| 7,255,525 B2 | 8/2007 | Smith et al. | |
| 7,381,022 B1 | 6/2008 | King | |
| 7,591,630 B2 | 9/2009 | Lert, Jr. | |
| 7,603,299 B1 | 10/2009 | Dewey, Jr. et al. | |
| 7,640,863 B2 | 1/2010 | Minges | |
| 7,861,844 B2 | 1/2011 | Hayduchok et al. | |
| 7,894,932 B2 | 2/2011 | Mountz et al. | |
| 7,894,933 B2 | 2/2011 | Mountz et al. | |
| 7,896,243 B2 | 3/2011 | Herskovitz | |
| 7,931,431 B2 | 4/2011 | Benedict et al. | |
| 7,938,324 B2 | 5/2011 | Tamarkin et al. | |
| 7,991,505 B2 | 8/2011 | Lert, Jr. et al. | |
| 8,104,601 B2 | 1/2012 | Hayduchok et al. | |
| 8,201,737 B1 | 6/2012 | Palacios Durazo et al. | |
| 8,276,740 B2 | 10/2012 | Hayduchok et al. | |
| 8,311,902 B2 | 11/2012 | Mountz et al. | |
| 8,327,609 B2 | 12/2012 | Krizmanic et al. | |
| 8,425,173 B2 | 4/2013 | Lert et al. | |
| 8,447,665 B1 | 5/2013 | Schoenharl et al. | |
| 8,483,869 B2 | 7/2013 | Wurman et al. | |
| 8,527,325 B1 | 9/2013 | Atreya et al. | |
| 8,579,574 B2 | 11/2013 | Hanel | |
| 8,594,835 B2 | 11/2013 | Lert et al. | |
| 8,622,194 B2 | 1/2014 | DeWitt et al. | |
| 8,626,335 B2 | 1/2014 | Wurman et al. | |
| 8,639,531 B2 | 1/2014 | Hasan et al. | |
| 8,690,510 B1 | 4/2014 | Razumov | |
| 8,694,152 B2 | 4/2014 | Cyrulik et al. | |
| 8,718,814 B1 | 5/2014 | Clark et al. | |
| 8,721,250 B2 | 5/2014 | Razumov | |
| 8,721,251 B1 | 5/2014 | Razumov | |
| 8,734,079 B1 | 5/2014 | Razumov | |
| 8,738,177 B2 | 5/2014 | Van Ooyen et al. | |
| 8,740,538 B2 | 6/2014 | Lert et al. | |
| 8,831,984 B2 | 9/2014 | Hoffman et al. | |
| 8,892,240 B1 | 11/2014 | Vliet et al. | |
| 8,965,562 B1 | 2/2015 | Wurman et al. | |
| 8,972,045 B1 | 3/2015 | Mountz et al. | |
| 8,983,647 B1* | 3/2015 | Dwarakanath | G06Q 10/087 700/216 |
| 9,008,828 B2 | 4/2015 | Worsley | |
| 9,008,829 B2 | 4/2015 | Worsley | |
| 9,008,830 B2 | 4/2015 | Worsley | |
| 9,010,517 B2 | 4/2015 | Hayduchok et al. | |
| 9,020,632 B2 | 4/2015 | Naylor | |
| 9,037,286 B2 | 5/2015 | Lert | |
| 9,051,120 B2 | 6/2015 | Lert et al. | |
| 9,096,375 B2 | 8/2015 | Lert et al. | |
| 9,111,251 B1 | 8/2015 | Brazeau | |
| 9,120,622 B1 | 9/2015 | Elazary et al. | |
| 9,129,250 B1 | 9/2015 | Sestini et al. | |
| 9,139,363 B2 | 9/2015 | Lert | |
| 9,147,208 B1 | 9/2015 | Argue et al. | |
| 9,216,857 B1 | 12/2015 | Kalyan et al. | |
| 9,242,798 B2 | 1/2016 | Guan | |
| 9,260,245 B2 | 2/2016 | Este et al. | |
| 9,321,591 B2 | 4/2016 | Lert et al. | |
| 9,330,373 B2 | 5/2016 | Mountz et al. | |
| 9,334,113 B2 | 5/2016 | Naylor | |
| 9,334,116 B2 | 5/2016 | DeWitt et al. | |
| 9,378,482 B1 | 6/2016 | Pikler et al. | |
| 9,409,664 B1 | 8/2016 | Vliet et al. | |
| 9,423,796 B2 | 8/2016 | Sullivan et al. | |
| 9,428,295 B2 | 8/2016 | Vliet et al. | |
| 9,466,045 B1 | 10/2016 | Kumar | |
| 9,550,624 B2 | 1/2017 | Khodl et al. | |
| 9,626,709 B2 | 4/2017 | Koch et al. | |
| 9,733,646 B1 | 8/2017 | Nusser et al. | |
| 9,815,625 B2 | 11/2017 | DeWitt et al. | |
| 9,821,959 B2 | 11/2017 | Hognaland | |
| 9,827,683 B1 | 11/2017 | Hance et al. | |
| 9,852,396 B2 | 12/2017 | Jones et al. | |
| 9,978,036 B1 | 5/2018 | Eller | |
| 10,127,514 B2 | 11/2018 | Napoli | |
| 10,229,385 B2 | 3/2019 | Evers et al. | |
| 10,360,531 B1 | 7/2019 | Stallman et al. | |
| 10,482,421 B1* | 11/2019 | Ducrou | G06Q 10/0836 |
| 2002/0059121 A1 | 5/2002 | Schneider et al. | |
| 2002/0143669 A1 | 10/2002 | Scheer | |
| 2003/0110104 A1 | 6/2003 | King et al. | |
| 2003/0197061 A1 | 10/2003 | Din | |
| 2004/0010337 A1 | 1/2004 | Mountz | |
| 2004/0010339 A1 | 1/2004 | Mountz | |
| 2004/0024730 A1 | 2/2004 | Brown et al. | |
| 2004/0111337 A1 | 6/2004 | Feeney et al. | |
| 2004/0249497 A1 | 12/2004 | Saigh et al. | |
| 2004/0254825 A1 | 12/2004 | Hsu et al. | |
| 2005/0047895 A1 | 3/2005 | Lert | |
| 2005/0060246 A1 | 3/2005 | Lastinger et al. | |
| 2005/0096936 A1 | 5/2005 | Lambers | |
| 2005/0108114 A1 | 5/2005 | Kaled | |
| 2005/0149226 A1 | 7/2005 | Stevens et al. | |
| 2005/0182695 A1 | 8/2005 | Lubow et al. | |
| 2005/0256787 A1 | 11/2005 | Wadawadigi et al. | |
| 2005/0267791 A1 | 12/2005 | LaVoie et al. | |
| 2005/0278062 A1 | 12/2005 | Janert et al. | |
| 2006/0020366 A1 | 1/2006 | Bloom | |
| 2006/0108419 A1 | 5/2006 | Som | |
| 2006/0182548 A1 | 8/2006 | Gretsch et al. | |
| 2006/0257236 A1 | 11/2006 | Stingel, III et al. | |
| 2007/0011053 A1 | 1/2007 | Yap | |
| 2007/0016496 A1 | 1/2007 | Bar et al. | |
| 2007/0127691 A1 | 6/2007 | Lert, Jr. | |
| 2007/0162353 A1 | 7/2007 | Borders et al. | |
| 2007/0244758 A1 | 10/2007 | Xie | |
| 2007/0276535 A1 | 11/2007 | Haag | |
| 2007/0294029 A1 | 12/2007 | D'Andrea et al. | |
| 2008/0040244 A1 | 2/2008 | Ricciuti et al. | |
| 2008/0131241 A1 | 6/2008 | King | |
| 2008/0215180 A1 | 9/2008 | Kota | |
| 2009/0074545 A1 | 3/2009 | Lert, Jr. | |
| 2009/0149985 A1 | 6/2009 | Chirnomas | |
| 2009/0157472 A1 | 6/2009 | Burazin et al. | |
| 2009/0276264 A1 | 11/2009 | Pandit et al. | |
| 2010/0010902 A1 | 1/2010 | Casey | |
| 2010/0060455 A1 | 3/2010 | Frabasile | |
| 2010/0076591 A1 | 3/2010 | Lert, Jr. | |
| 2010/0114790 A1 | 5/2010 | Strimling et al. | |
| 2010/0262278 A1 | 10/2010 | Winkler | |
| 2010/0310344 A1 | 12/2010 | Hinnen et al. | |
| 2010/0316468 A1 | 12/2010 | Lert et al. | |
| 2010/0316469 A1 | 12/2010 | Lert et al. | |
| 2010/0316470 A1* | 12/2010 | Lert | B65G 1/045 414/273 |
| 2010/0322746 A1 | 12/2010 | Lert | |
| 2010/0322747 A1 | 12/2010 | Lert et al. | |
| 2011/0008138 A1 | 1/2011 | Yamashita | |
| 2012/0101627 A1 | 4/2012 | Lert | |

(56) References Cited

U.S. PATENT DOCUMENTS

| | | |
|---|---|---|
| 2012/0143427 A1 | 6/2012 | Hoffman et al. |
| 2012/0150340 A1 | 6/2012 | Suess et al. |
| 2012/0173351 A1 | 7/2012 | Hanson et al. |
| 2012/0186942 A1 | 7/2012 | Toebes et al. |
| 2012/0195720 A1 | 8/2012 | Sullivan et al. |
| 2012/0330458 A1 | 12/2012 | Weiss |
| 2013/0226718 A1 | 8/2013 | Ascarrunz et al. |
| 2013/0235206 A1 | 9/2013 | Smith et al. |
| 2013/0246229 A1 | 9/2013 | Mountz et al. |
| 2013/0310967 A1 | 11/2013 | Olson et al. |
| 2013/0317642 A1 | 11/2013 | Asada et al. |
| 2013/0346204 A1 | 12/2013 | Wissner-Gross et al. |
| 2014/0003727 A1 | 1/2014 | Lortz et al. |
| 2014/0040075 A1* | 2/2014 | Perry .............. G06Q 30/0635 705/26.81 |
| 2014/0052498 A1 | 2/2014 | Marshall et al. |
| 2014/0088758 A1 | 3/2014 | Lert et al. |
| 2014/0100769 A1* | 4/2014 | Wurman .............. G06Q 10/087 701/301 |
| 2014/0100999 A1 | 4/2014 | Mountz et al. |
| 2014/0136218 A1 | 5/2014 | Bolene et al. |
| 2014/0143099 A1 | 5/2014 | Wilkins |
| 2014/0156553 A1 | 6/2014 | Leach et al. |
| 2014/0212249 A1 | 7/2014 | Kawano |
| 2014/0257555 A1 | 9/2014 | Bastian, II |
| 2014/0271063 A1 | 9/2014 | Lert et al. |
| 2014/0279294 A1 | 9/2014 | Field-Darragh et al. |
| 2014/0288696 A1* | 9/2014 | Lert .............. B65G 1/0492 700/216 |
| 2014/0308098 A1 | 10/2014 | Lert et al. |
| 2014/0324491 A1 | 10/2014 | Banks et al. |
| 2014/0330603 A1 | 11/2014 | Corder et al. |
| 2014/0336814 A1 | 11/2014 | Moore et al. |
| 2014/0343717 A1 | 11/2014 | Dorval et al. |
| 2014/0351101 A1 | 11/2014 | Danelski |
| 2015/0051994 A1 | 2/2015 | Ward et al. |
| 2015/0071743 A1 | 3/2015 | Lert |
| 2015/0154535 A1 | 6/2015 | Wappler et al. |
| 2015/0170256 A1 | 6/2015 | Pettyjohn et al. |
| 2015/0178671 A1 | 6/2015 | Jones et al. |
| 2015/0178673 A1 | 6/2015 | Penneman |
| 2015/0266672 A1 | 9/2015 | Lert et al. |
| 2015/0286967 A1 | 10/2015 | Lert et al. |
| 2015/0310447 A1 | 10/2015 | Shaw |
| 2015/0375938 A9 | 12/2015 | Lert et al. |
| 2016/0016733 A1 | 1/2016 | Lert |
| 2016/0055452 A1 | 2/2016 | Qin |
| 2016/0063604 A1 | 3/2016 | Shaffer et al. |
| 2016/0075512 A1 | 3/2016 | Lert |
| 2016/0101940 A1 | 4/2016 | Grinnell et al. |
| 2016/0107838 A1* | 4/2016 | Swinkels ............... B66F 9/063 414/273 |
| 2016/0110702 A1 | 4/2016 | Landers, Jr. et al. |
| 2016/0129592 A1 | 5/2016 | Saboo et al. |
| 2016/0140488 A1 | 5/2016 | Lindbo |
| 2016/0145045 A1 | 5/2016 | Mountz et al. |
| 2016/0167227 A1 | 6/2016 | Wellman et al. |
| 2016/0171592 A1 | 6/2016 | Pugh et al. |
| 2016/0223339 A1 | 8/2016 | Pellow et al. |
| 2016/0253740 A1 | 9/2016 | Goulart |
| 2016/0260158 A1 | 9/2016 | High et al. |
| 2016/0299782 A1 | 10/2016 | Jones et al. |
| 2016/0311617 A1 | 10/2016 | Van Den Berk |
| 2016/0314431 A1 | 10/2016 | Quezada |
| 2016/0325933 A1 | 11/2016 | Stiernagle et al. |
| 2016/0355337 A1 | 12/2016 | Lert et al. |
| 2016/0364786 A1 | 12/2016 | Wankhede |
| 2016/0371650 A1 | 12/2016 | Schmidt et al. |
| 2017/0036798 A1 | 2/2017 | Prahlad et al. |
| 2017/0043953 A1 | 2/2017 | Battles et al. |
| 2017/0066592 A1 | 3/2017 | Bastian, II et al. |
| 2017/0068973 A1 | 3/2017 | Sinkel |
| 2017/0132559 A1 | 5/2017 | Jones et al. |
| 2017/0137222 A1 | 5/2017 | Lert, Jr. |
| 2017/0137223 A1 | 5/2017 | Lert, Jr. |
| 2017/0158430 A1 | 6/2017 | Raizer |
| 2017/0185933 A1 | 6/2017 | Adulyasak et al. |
| 2017/0185955 A1 | 6/2017 | Hufschmid et al. |
| 2017/0200108 A1 | 7/2017 | Au et al. |
| 2017/0206480 A1 | 7/2017 | Naumann et al. |
| 2017/0213186 A1 | 7/2017 | Grifoni |
| 2017/0220995 A1 | 8/2017 | Paulweber et al. |
| 2017/0228701 A1 | 8/2017 | Wosk et al. |
| 2017/0260008 A1 | 9/2017 | DeWitt et al. |
| 2017/0267452 A1 | 9/2017 | Goren et al. |
| 2017/0278047 A1 | 9/2017 | Welty et al. |
| 2017/0285648 A1 | 10/2017 | Welty et al. |
| 2017/0297820 A1 | 10/2017 | Grinnell et al. |
| 2017/0301004 A1 | 10/2017 | Chirnomas |
| 2017/0313514 A1 | 11/2017 | Lert, Jr. et al. |
| 2017/0323250 A1 | 11/2017 | Lindbo et al. |
| 2017/0330142 A1 | 11/2017 | Kanellos et al. |
| 2017/0330270 A1 | 11/2017 | Kanellos et al. |
| 2018/0005173 A1 | 1/2018 | Elazary et al. |
| 2018/0029797 A1 | 2/2018 | Hance et al. |
| 2018/0032949 A1 | 2/2018 | Galluzzo et al. |
| 2018/0137452 A1 | 5/2018 | Khatravath et al. |
| 2018/0182054 A1 | 6/2018 | Yao et al. |
| 2018/0211203 A1 | 6/2018 | Greenberg |
| 2018/0237221 A1 | 8/2018 | Lindbo et al. |
| 2018/0237222 A1 | 8/2018 | Issing et al. |
| 2018/0300680 A1 | 10/2018 | Undernehr et al. |
| 2018/0314991 A1 | 11/2018 | Grundberg |
| 2018/0319590 A1 | 11/2018 | Lindbo et al. |
| 2018/0342031 A1 | 11/2018 | Tada et al. |
| 2019/0197451 A1 | 6/2019 | Balasingham |

FOREIGN PATENT DOCUMENTS

| | | |
|---|---|---|
| EP | 0302205 A2 | 2/1989 |
| EP | 1348646 | 10/2003 |
| EP | 2650237 B1 | 11/2014 |
| EP | 2651786 B1 | 5/2016 |
| EP | 2651787 B1 | 5/2016 |
| JP | H0642810 | 6/1994 |
| WO | 2005097550 | 10/2005 |
| WO | 2010100513 | 9/2010 |
| WO | 20100118412 A1 | 10/2010 |
| WO | 2014166640 | 10/2014 |
| WO | 2015005873 | 1/2015 |
| WO | 2016172793 | 11/2016 |
| WO | 2016199033 | 12/2016 |
| WO | 2017064401 A1 | 4/2017 |

OTHER PUBLICATIONS

International Search Report for International Application No. PCT/US2018/013203 dated Apr. 5, 2018.
International Search Report for International Application No. PCT/US2018/19537 dated Apr. 13, 2018.
Office Action dated May 4, 2018 in U.S. Appl. No. 15/816,832.
Response to Office Action filed May 9, 2018 in U.S. Appl. No. 15/171,802.
Notice of Allowance dated Mar. 20, 2019 in U.S. Appl. No. 15/421,208.
Response to Office Action filed Mar. 22, 2019 in U.S. Appl. No. 15/816,832.
Office Action dated Apr. 15, 2019 in U.S. Appl. No. 15/816,832.
Notice of Allowance and Fee(s) Due dated Oct. 9, 2018 in U.S. Appl. No. 15/171,802.
Final Office Action dated Nov. 2, 2018 in U.S. Appl. No. 15/816,832.
Response to Office Action filed Nov. 13, 2018 in U.S. Appl. No. 15/421,208.
English language Abstract for WO2017064401 published Apr. 20, 2017.
Response to Office Action filed Aug. 2, 2018 in U.S. Appl. No. 15/816,832.
Final Office Action dated Aug. 7, 2018 in U.S. Appl. No. 15/171,802.
Response to Office Action filed Sep. 12, 2018 in U.S. Appl. No. 15/171,802.

(56) References Cited

OTHER PUBLICATIONS

Notice of Allowance and Fee(s) Due dated Aug. 31, 2018, U.S. Appl. No. 15/978,423.
Notice of Allowance dated Jan. 17, 2019 in U.S. Appl. No. 15/421,208.
Non-Final Rejection dated Sep. 3, 2014 in U.S. Appl. No. 14/213,187.
Amendment filed Feb. 27, 2015 in U.S. Appl. No. 14/213,187.
Notice of Allowance and Fees Due dated May 20, 2015 in U.S. Appl. No. 14/213,187.
Non-Final Rejection dated Jan. 12, 2016 in U.S. Appl. No. 14/860,410.
Amendment filed Apr. 8, 2016 in U.S. Appl. No. 14/860,410.
Non-Final Rejection dated Jul. 20, 2016 in U.S. Appl. No. 14/860,410.
Amendment filed Sep. 27, 2016 in U.S. Appl. No. 14/860,410.
Notice of Allowance and Fees Due dated Nov. 10, 2016 in U.S. Appl. No. 14/860,410.
Non-Final Rejection dated Apr. 10, 2017 in U.S. Appl. No. 15/421,208.
Amendment filed Sep. 11, 2017 in U.S. Appl. No. 15/421,208.
Supplemental Amendment filed Oct. 12, 2017 in U.S. Appl. No. 15/421,208.
Notice of Allowance and Fee(s) Due dated Oct. 5, 2017 in U.S. Appl. No. 15/421,239.
International Search Report dated Oct. 7, 2016 in International Application No. PCT/US2016/035547.
Restriction Requirement dated Nov. 3, 2017 in U.S. Appl. No. 15/171,802, filed Jun. 2, 2016.
International Search Report and Written Opinion dated Sep. 6, 2017 in International Patent Application No. PCT/US2017/032171.
English language Abstract for WO2014166640 published Oct. 16, 2014.
Response to Restriction Requirement filed Nov. 20, 2017 in U.S. Appl. No. 15/171,802.
Notice of Allowance and Fee(s) Due dated Dec. 8, 2017 in U.S. Appl. No. 15/421,208.
Notice of Allowance and Fee(s) Due dated Jan. 16, 2018 in U.S. Appl. No. 15/699,700.
Notice of Allowance and Fee(s) Due dated Jan. 19, 2018 in U.S. Appl. No. 15/421,239.
International Search Report for International Application No. PCT/US2017/062423 dated Feb. 5, 2018.
Office Action dated Feb. 12, 2018 in U.S. Appl. No. 15/171,802.
Response to Office Action filed Sep. 23, 2019 in European Patent Application No. 16804451.9.
Response to Office Action filed Oct. 29, 2019 in U.S. Appl. No. 15/826,045.
Final Office Action dated Nov. 1, 2019 in U.S. Appl. No. 15/816,832.
Office Action dated Nov. 20, 2019 in U.S. Appl. No. 15/826,045.
Preliminary Amendment filed Dec. 20, 2019 in U.S. Appl. No. 16/594,647.
Response to Office Action dated Jan. 24, 2020 in U.S. Appl. No. 15/951,956.
Extended European Search Report dated Mar. 13, 2020 in European Patent Application No. 19217215.3.
Final Office Action dated Mar. 24, 2020 in U.S. Appl. No. 15/951,956.
Response to Office Action filed Mar. 30, 2020 in U.S. Appl. No. 15/816,832.
Office Action dated Apr. 30, 2020 in U.S. Appl. No. 15/816,832.
Response to Office Action filed Apr. 15, 2020 in U.S. Appl. No. 15/826,045.
Response to Office Action filed Apr. 17, 2020 in European Patent Application No. 18709235.8.
Response to Office Action filed Mar. 6, 2020 in European Patent Application No. 18702006.0.
Office Action dated Nov. 18, 2019 in U.S. Appl. No. 15/903,993.
Response to Office Action filed Apr. 16, 2020 in U.S. Appl. No. 15/903,993.
Notice of Allowance and Fee(s) Due dated May 15, 2020 in U.S. Appl. No. 15/903,993.
Qi Xu, "Improving Responsiveness of Supply Chain through RFID Visibility Technology", 2009 IEEE/Informs International Conference on Service Operations, Logistics and Informatics, Chicago, IL, Jul. 22-24, 2009, pp. 513-517.
Harrison et al., "Intelligent distribution and logistics", IEE Proceedings—Intelligent Transport Systems, vol. 153, No. 2, pp. 167-180, Jun. 2006.
N. Viswanadham, "The past, present, and future of supply-chain automation", IEE Robotics & Automation Magazine, vol. 9, No. 2, pp. 48-56, Jun. 2002.
C. Prasse et al., "Flow IoT will change the design and operation of logistics systems", 2014 International Conference on the Internet of Things (IOT), Oct. 6-8, 2014, pp. 55-60.
Leung et al., "Design of a Case-Based Multi-Agent Wave Picking Decision Support System for Handling E-Commerce Shipments", 2016 Portland International Conference on Management of Engineering and Technology (PICMET), Sep. 4-8, 2016, pp. 2248-2256.
Final Office Action dated Jun. 18, 2020 in U.S. Appl. No. 15/826,045.
Response to Office Action filed Aug. 24, 2020 in U.S. Appl. No. 15/591,956.
Office Action dated Sep. 14, 2020 in U.S. Appl. No. 15/591,956.
Office Action dated Sep. 14, 2020 in U.S. Appl. No. 15/903,993.
International Search Report and Written Opinion dated Sep. 4, 2020 in International Patent Application No. PCT/ US2020/033250.
English language Abstract for DE3624033 published Aug. 6, 1987.
Office Action filed Oct. 19, 2020 in U.S. Appl. No. 15/816,832.
Response to Office Action filed Nov. 2, 2020, with English machine translation, in Chinese Patent Application No. 201780042943.2.

* cited by examiner

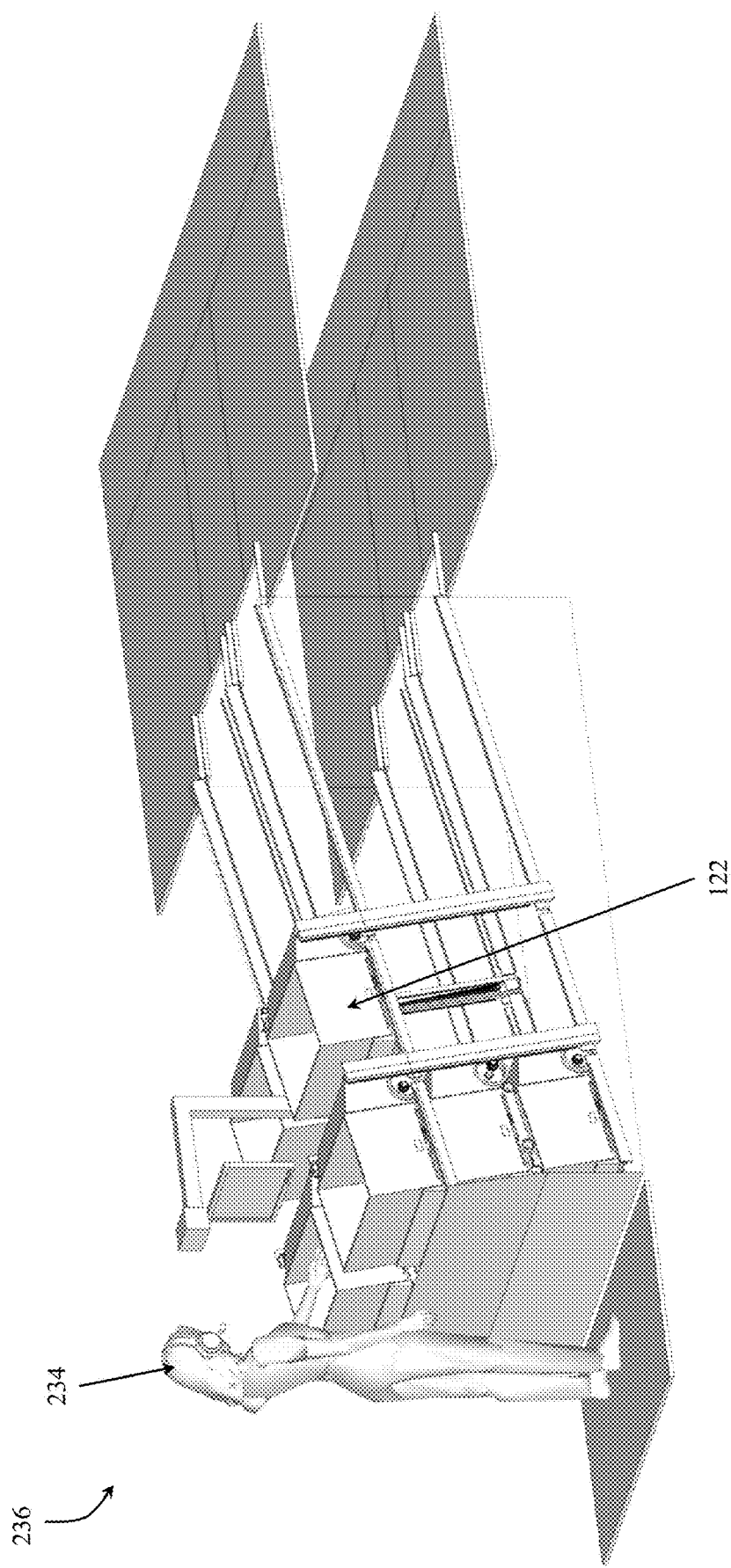

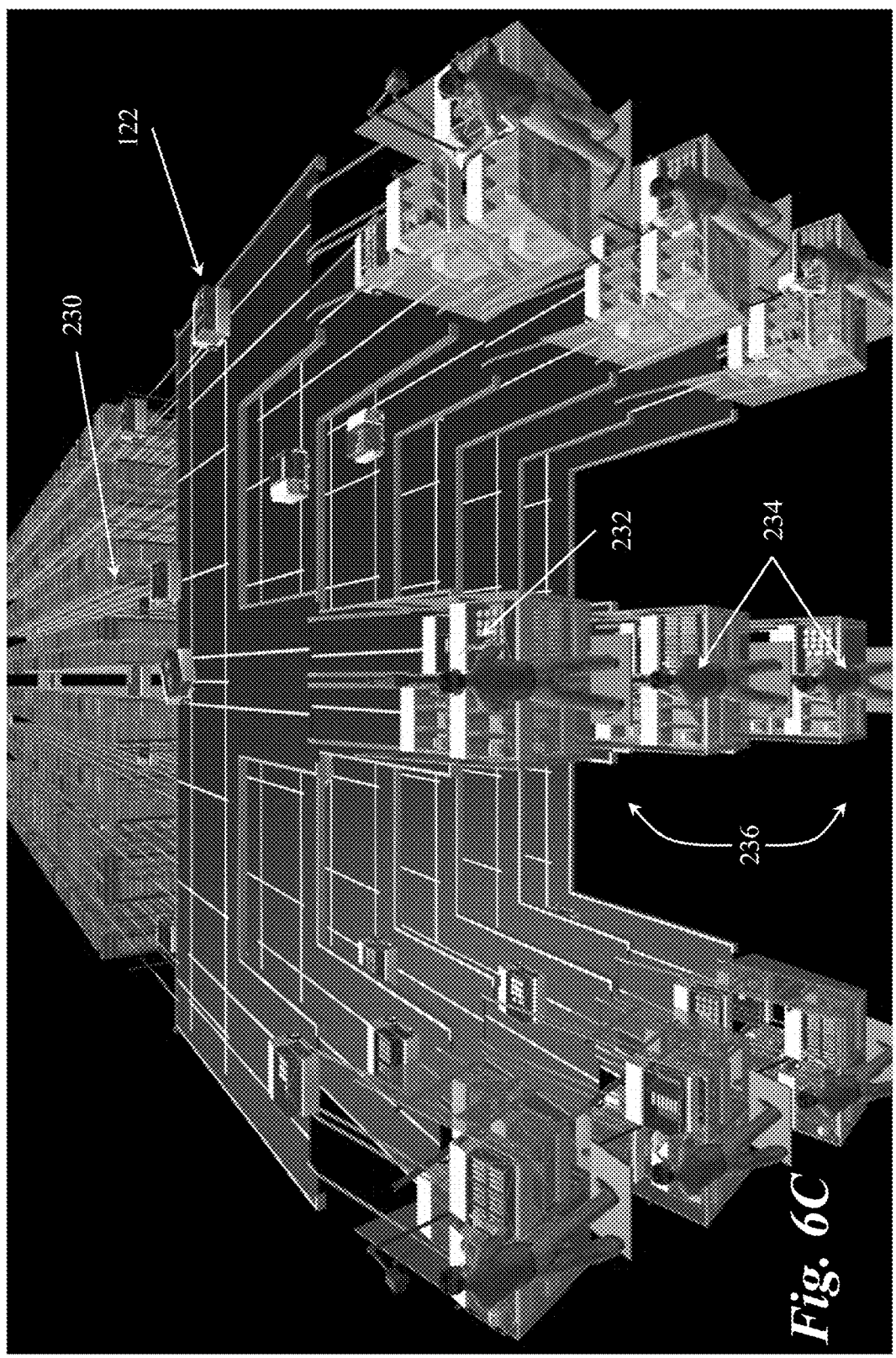

INTERCHANGEABLE AUTOMATED MOBILE ROBOTS WITH A PLURALITY OF OPERATING MODES CONFIGURING A PLURALITY OF DIFFERENT ROBOT TASK CAPABILITIES

PRIORITY CLAIM

The present application claims priority to U.S. Provisional Patent Application No. 62/444,693, filed on Jan. 10, 2017, entitled "INTERCHANGEABLE AUTOMATED MOBILE ROBOTS WITH A PLURALITY OF OPERATING MODES CONFIGURING A PLURALITY OF DIFFERENT ROBOT TASK CAPABILITIES," which application is incorporated by reference herein in its entirety.

FIELD OF THE INVENTION

The present invention relates to automated mobile robots for use within automated mobile robot storage and retrieval systems of an automated inventory management system, such as in an automated store. In particular, the present invention relates to a mobile robot configured and enabled to perform in all areas of the automated store, including moving horizontally and vertically in a multi-level storage structure, and operating in an order fulfillment mode, a replenishment mode, and a delivery mode.

BACKGROUND

Generally, human operated and automated inventory management systems include a plurality of vertical and/or horizontal storage racks for holding and transporting inventory. Typically, inventory is stored in boxes stacked on pallets and placed into racks. The inventory can be removed from the storage racks through a combination of human operated transportation devices, such as forklifts, and automated mobile robots configured for moving inventory in and out of the storage racks. Conventional systems rely on human operation (e.g., forklifts, hand trucks, manual lifting) to receive, remove, replenish, etc. inventory. Additionally, automated systems exist to assist humans in certain tasks within the inventory management systems (e.g., picking and stocking inventory). Based on the specific tasks that the automated systems are designed for, customized and specialized robots or other automated devices are needed to carry out each of those tasks.

These systems and methodologies experience some shortcomings. In particular, most inventory management systems rely heavily on human operators, instructors, and/or overseers to make sure that the tasks are performed properly. Human operators can be prone to error as well as deviation from defined tasks within an inventory management system which can go unnoticed and result in lost, damaged, expired, etc. inventory. Specialized automated systems can be designed to assist the human operators but each machine requires specific customization to the inventory management system, and adds complexity. Inventory in traditional stocking systems is difficult to manage, optimize, track, and retrieval can be complicated when items are misplaced. Additionally, having to obtain a customized automated system for each portion of the inventory management system that is desired to be automated can be costly. Extra capacity in the form of extra mobile robots must be procured for each type of mobile robot (e.g., a fulfillment robot, a replenishment robot, and a delivery robot, and a storage management robot). Because each form of robot is limited in its ability to perform certain tasks for which it was designed, it is more difficult to manage workload across the entire inventory management system. Bottlenecks may form in e.g., delivery, and without the ability to leverage resources of other robots from e.g., fulfillment, replenishment or storage, the bottleneck will reduce overall inventory flow until demand reduces or more delivery robots are procured). Such systems are capital intensive and not sufficiently efficient in terms of robot resources.

SUMMARY

There is a need for an improved system and method for managing inventory within all portions of an automated store that do not experience the above shortcomings. A plurality of interchangeable mobile robots are assigned to different operations based on demand within the automated store to increase efficiency and the effectiveness of inventory management (e.g., inventory replenishment, consolidation, organization, retrieval, etc.). The present invention is directed toward further solutions to address this need, in addition to having other desirable characteristics. Specifically, the present invention is directed to a system and method of operation of an automated store with a plurality of interchangeable robots configured with different modes of operation, assigned based on real-time demand, in a manner to optimize inventory usage throughout the entire automated store system. In particular, the present invention provides a system and method to provide real-time task assignments for mode of operation for the plurality of interchangeable automated mobile robots. The modes of operation include a replenishment mode in which inventory is restocked, a defragmentation mode in which eaches of goods are consolidated within totes and the totes are consolidated, an order fulfillment mode in which orders of goods are picked for customers, and a delivery mode in which completed orders are delivered to the customers. Each of the automated mobile robots are configured with the ability to operate in each of these modes and are allocated to operate in a single mode of operation at any given period of time to optimally manage the inventory based on real-time demand within the automated store.

In accordance with example embodiments of the present invention, an automated store is provided. The automated store includes a building structure partitioned into an automated fulfillment section, a shopping section, and a replenishment section, and the shopping section including one or more goods drop-off transfer stations and a delivery section. The replenishment section includes a workstation configured for transferring replenishment eaches into designated storage totes. A transfer station receives and stores a delivery bundle in a designated location until a customer arrives to take possession of the delivery bundle. A mobile robot propels itself horizontally and vertically throughout the automated fulfillment section, the delivery section, and the transfer station in one or more different modes of operation based on task demand. The one or more different modes of operation include an order fulfillment mode, a replenishment mode, and a delivery mode. The order fulfillment mode includes retrieving order totes from the automated fulfillment section and delivering the order totes to the delivery section. The replenishment mode includes receiving eaches of goods and depositing the eaches of goods in designated storage totes. The delivery mode includes receiving delivery bundles and transporting the delivery bundles to designated locations at the transfer station.

In accordance with aspects of the present invention, the automated fulfillment section includes a storage rack structure having a plurality of rack modules separated by aisles and having a plurality of storage levels. The storage rack structure stores a plurality of interchangeable totes that are designated as empty storage totes when empty, designated as storage totes when containing eaches of goods, designated as order totes when containing eaches of goods for orders, or combinations thereof. The automated store can further include one or more sub-totes that are sized, dimensioned, and configured to fit within the empty storage totes and/or the order totes, and wherein a plurality of empty totes and/or order totes are sized, dimensioned, and configured to fit on a standard pallet. The standard pallet can include one or more of a North American pallet, a European pallet, an Australian pallet, or an Asian pallet. The one or more sub-totes can include one or more of ¼ sub-totes, ½ sub-totes, and/or ¾ sub-totes. The one or more different modes of operation of the mobile robot can further include a defragmentation mode. When the mobile robot is in the defragmentation mode, the mobile robot can deliver interchangeable totes to be defragged to a decanting station to have the one or more sub-totes re-arranged within the interchangeable totes located in the storage rack structure. The one or more sub-totes can be re-arranged by removing the one or more sub-totes from storage totes of the plurality of interchangeable totes that are partially filled and placing the one or more sub-totes into other storage totes of the plurality of interchangeable totes that are partially filled until the other storage totes are completely filled, in such a way that consolidates the one or more sub-totes and creates empty totes out of previously partially filed storage totes. The defragmentation mode can further include combining empty sub-totes to increase storage density and free empty sub-totes for the replenishment mode.

In accordance with aspects of the present invention, the one or more goods drop-off transfer stations are located in the automated store at a checkout section. In accordance with aspects of the present invention, the delivery section includes a merge module that combines eaches of goods picked from the automated fulfillment section with goods picked from the shopping section and deposited at the one or more goods drop-off transfer stations, the combined eaches of goods forming the delivery bundle. In accordance with aspects of the present invention, when the mobile robot is designated and operates in the order fulfillment mode, the mobile robot propels itself through a storage rack structure of the automated fulfillment section, placing totes into the storage rack structure, removing totes from the storage rack structure, and transporting totes.

In accordance with aspects of the present invention, the task demand is determined at least in part based on a time of day in such a way that the time of day acts as a basis for designation of the mobile robot of the order fulfillment mode, the replenishment mode, or the delivery mode. The task demand can be determined at least in part based on a relative quantity of tasks to be completed in each of the automated fulfillment section and the shopping section. The task demand can be determined at least in part based on an indication of the customer arriving to pick up an order at the transfer station. The task demand can be determined at least in part based on relative quantity of tasks to be completed in each of the automated fulfillment section and the shopping section as well as an applied weighting giving higher priority to delivery of a delivery bundle versus a replenishment task.

In accordance with aspects of the present invention, the automated store further includes a plurality of interchangeable mobile robots designated and operating in any of the automated fulfillment section and the shopping section. The plurality of interchangeable mobile robots can be managed by directing a larger ratio of mobile robots to fulfillment tasks and delivery tasks relative to other tasks during peak operating hours. The plurality of interchangeable mobile robots can be managed by directing a larger ratio of mobile robots to replenishment tasks relative to other tasks during off-peak operating hours.

In accordance with aspects of the present invention, a checkout section located in the automated store further includes a payment transaction facilitator enabling the customer to render payment for goods. The checkout section can further include one or one or more checkout kiosks.

In accordance with aspects of the present invention, goods contained in the delivery bundles include fresh goods, packaged goods, or both. Returns of goods can be accepted at the transfer station, placed in on or more sub-totes or totes, and sent to the automated fulfillment section.

In accordance with example embodiments of the present invention, an automated inventory management system is provided. The system includes an automated robot storage and retrieval system. The automated robot storage and retrieval system includes a storage rack structure including a plurality of rack modules separated by aisles and having a plurality of storage levels. The storage rack structure stores a plurality of totes that are empty, contain eaches, or contain orders. The automated robot storage and retrieval system also includes at least one mobile robot that propels itself horizontally and vertically throughout the storage rack structure, placing totes into the storage rack structure, removing totes from the storage rack structure, and transporting totes. The at least one mobile robot has a plurality of operating modes consisting of order fulfillment mode, replenishment mode, and delivery mode. When the automated inventory management system directs the at least one mobile robots to engage one of the plurality of operating modes based on a task demand, an operating mode is engaged and the at least one mobile robots performs tasks assigned to be carried out in the directed operating mode.

In accordance with example embodiments of the present invention, a method is provided relating to operation of an automated store. The automated store includes a building structure partitioned into an automated fulfillment section, a shopping section, and a replenishment section. The shopping section includes a goods drop-off transfer stations, a delivery section and a transfer station. The replenishment section includes a workstation configured for transferring replenishment eaches into designated storage totes. The transfer station is configured to receive and store a delivery bundle in a designated location until a customer arrives to take possession of the delivery bundle. A mobile robot propels itself horizontally and vertically throughout the automated fulfillment section, the delivery section, and the transfer station in one or more different modes of operation based on task demand, the one or more different modes of operation including an order fulfillment mode, a replenishment mode, and a delivery mode. When the mobile robot is in the order fulfillment mode, the mobile robot retrieves order totes from the automated fulfillment section and delivers the order totes to the delivery section. When the mobile robot is in the replenishment mode, the mobile robot receives eaches of goods for the deposition of the eaches of goods in designated storage totes. When the mobile robot is in the delivery mode, the mobile robot receives delivery bundles and transports the delivery bundles to designated locations at the transfer station.

In accordance with aspects of the present invention, when the mobile robot is designated and operates in the order fulfillment mode, the mobile robot further propels itself through a storage rack structure of the automated fulfillment section, placing totes into the storage rack structure, removing totes from the storage rack structure, and transporting totes throughout the storage rack structure.

In accordance with aspects of the present invention, the method further includes determining the task demand based on a time of day in such a way that the time of day influences designation of the mobile robot of the order fulfillment mode, the replenishment mode, or the delivery mode. The method can further include determining the task demand based on relative quantity of tasks to be completed in each of the automated fulfillment section and the shopping section. The method can further include determining the task demand based on an indication of the customer arriving to pick up at least one of the delivery bundles at the transfer station. The method can further include determining the task demand based on relative quantity of tasks to be completed in each of the automated fulfillment section and the shopping section as well as an applied weighting giving higher priority to delivery of a delivery bundle versus a replenishment task.

In accordance with aspects of the present invention, a checkout section located in the automated store further includes a payment transaction facilitator enabling the customer to render payment for goods. The checkout section can further include one or one or more checkout kiosks.

In accordance with aspects of the present invention, goods contained in delivery bundles can include fresh goods, packaged goods, or both.

BRIEF DESCRIPTION OF THE FIGURES

These and other characteristics of the present invention will be more fully understood by reference to the following detailed description in conjunction with the attached drawings, in which:

FIGS. 6A, 6B, and 6C are illustrative depictions of picking workstations for use within the automated mobile robot storage and retrieval system;

DETAILED DESCRIPTION

Figure 1:
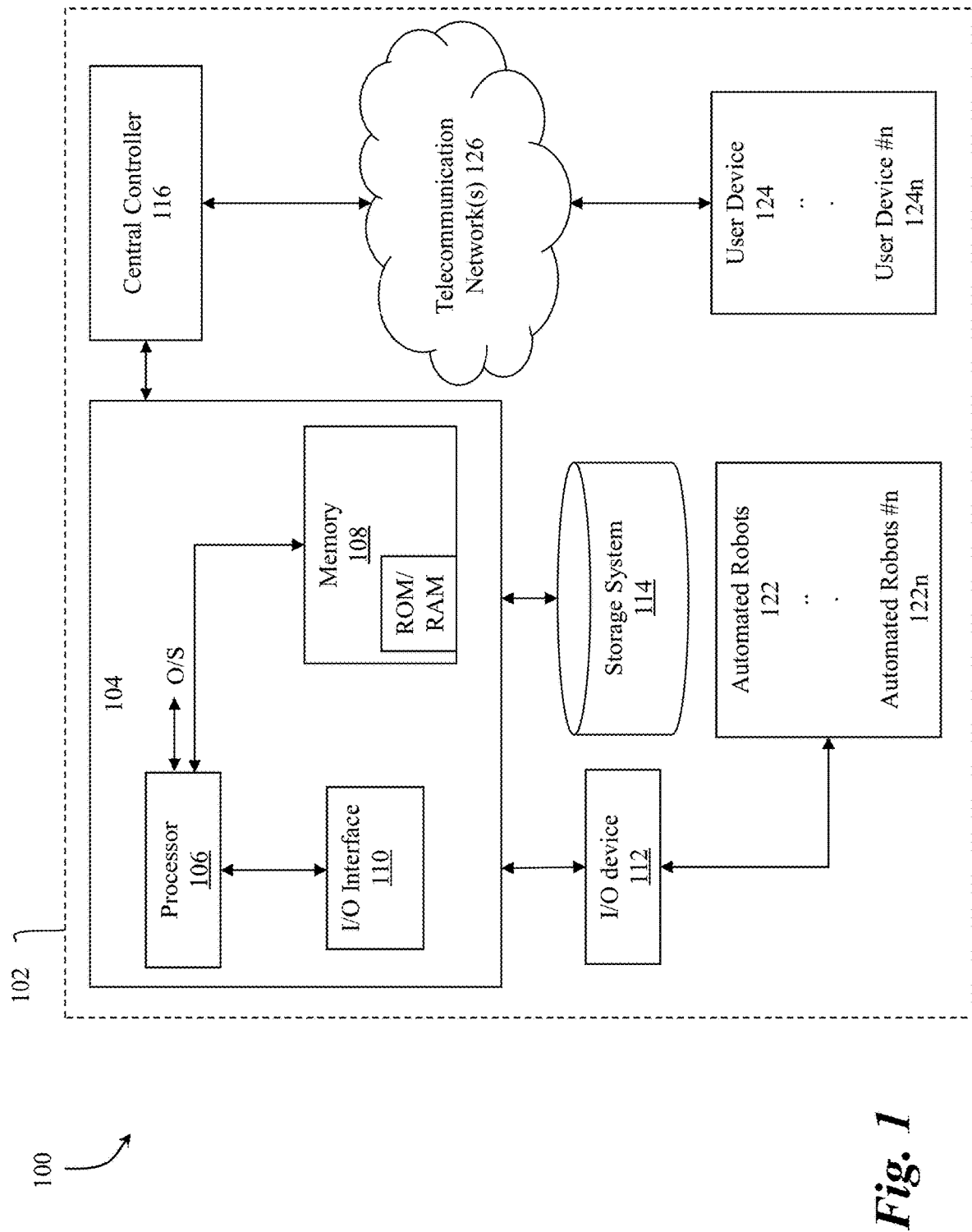
FIG. 1 is a diagrammatic illustration of an automated mobile robot storage and retrieval system.

An illustrative embodiment of the present invention relates to a system and method for managing inventory within the automated mobile robot storage and retrieval system by leveraging different modes of operation for each of a plurality of interchangeable automated mobile robots in the system. The modes of operation are designed to provide task demands to each of the plurality of interchangeable automated mobile robots to carry out different specific tasks throughout an automated mobile robot storage and retrieval system implemented at an automated store. The modes of operation and the task demands associated therewith are uniquely implemented to carry out tasks related to replenishment, defragmentation, order fulfillment, and delivery of goods. Additionally, each of the plurality of automated mobile robots are functionally the same and interchangeable with respect to the modes of operation they are capable of performing. With the system of the present invention, each of the plurality of interchangeable mobile robots can be associated with a particular mode of operation, and carry out that operation, with adjustments to the modes of operation being managed in real-time based at least in part on real-time demand or need for a particular task to be completed. This enables improved overall inventory management efficiency, and reduces the occurrence of bottlenecks throughout the system, without requiring an excess of underutilized robots waiting in standby or other non-operational modes until needed.

FIGS. 1 through 9, wherein like parts are designated by like reference numerals throughout, illustrate an example embodiment or embodiments of an automated inventory management system implemented in an automated store utilizing a plurality of interchangeable mobile robots enabled to be assigned one of several different operating modes based on real-time demand across the automated store facility, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an illustrative automated inventory management system 100 implemented with a plurality of automated mobile robots 122. In particular, FIG. 1 depicts the inventory management system 100 configured to control the various modes of operation for each automated mobile robot of the plurality of mobile robots 122 within the inventory management system 100. As utilized herein throughout, each of the plurality of mobile robots 122 are interchangeable with one another in that each mobile robot is capable of performing the full suite of operational modes and functions, such that if one mobile robot is insufficient to complete a task, any of the additional plurality of mobile robots may be tasked with the operational mode to perform the desired task.

In accordance with an example embodiment of the present invention, the inventory management system 100 includes or is included within an automated mobile robot storage and retrieval system 102. The automated mobile robot storage and retrieval system 102 is a combination of physical structure (e.g., a storage facility), hardware, and software configured to carry out aspects of the present invention. In particular, the automated mobile robot storage and retrieval system 102 includes a computing system with specialized software and databases designed for providing a method and system for managing inventory within an automated inventory management system. For example, the automated mobile robot storage and retrieval system 102 can be software installed on a computing device 104, a web based application provided by a computing device 104 which is accessible by other computing devices (e.g., the user devices 124), a cloud based application accessible by computing devices, or the like. The combination of hardware and software that make up the automated mobile robot storage and retrieval system 102 are specifically configured to provide a technical solution to a particular problem utilizing an unconventional combination of steps/operations to carry out aspects of the present invention. In particular, the automated mobile robot storage and retrieval system 102 is designed to execute a unique combination of steps to provide a novel approach enabling one or more automated mobile robots 122 and other devices to manage inventory and other tasks within the inventory management system 100.

In accordance with an example embodiment of the present invention, the automated mobile robot storage and retrieval system 102 includes a computing device 104 having a processor 106, a memory 108, an input output interface 110, input and output devices 112 and a storage system 114. Additionally, the computing device 104 can include an operating system configured to carry out operations for the applications installed thereon. As would be appreciated by one skilled in the art, the computing device 104 can include a single computing device, a collection of computing devices in a network computing system, a cloud computing infrastructure, or a combination thereof, as would be appreciated by those of skill in the art. Similarly, as would be appreciated by one of skill in the art, the storage system 114 can include any combination of computing devices configured to store and organize a collection of data. For example, storage system 114 can be a local storage device on the computing device 104, a remote database facility, or a cloud computing storage environment. The storage system 114 can store data related to operation of the automated mobile robot storage and retrieval system 102. For example, the storage system 114 can store databases for the automated mobile robots 122 and the various zones throughout the automated inventory management system 100. The storage system 114 can also include a database management system utilizing a given database model configured to interact with a user for analyzing the database data.

In accordance with an example embodiment of the present invention, the input and output devices 112 can include or otherwise be in communication with a combination of wireless transceivers. The wireless transceivers are configured to provide communication means between the automated mobile robot storage and retrieval system 102 and the plurality of automated mobile robots 122. As would be appreciated by one skilled in the art, the input and output devices 112 can include any combination of communication means known in the art for transmitting signals and data between the automated mobile robot storage and retrieval system 102 and the plurality of automated mobile robots 122. For example, the wireless transceivers utilized within the automated mobile robot storage and retrieval system 102 can include but is not limited to optical, near field or radio frequency identification, Wi-Fi, or Bluetooth wireless communication means to transmit signals and data to the plurality of automated mobile robots 122.

Continuing with FIG. 1, the automated mobile robot storage and retrieval system 102 can include a combination of core components to carry out the various functions of the present invention. In accordance with an example embodiment of the present invention, the automated mobile robot storage and retrieval system 102 can include a central controller 116 configured to manage the modes of operations for the automated mobile robots 122. In particular, each of the central controller 116 is configured to provide the mechanisms required to select and allocate the various modes of operation for the automated mobile robots 122 operating within the automated inventory management system 100. As would be appreciated by one skilled in the art, the central controller 116 can include any combination of hardware and software configured to carry out the various aspects of the present invention.

In accordance with an example embodiment of the present invention, the central controller 116 provides a user, operating the automated mobile robot storage and retrieval system 102, with the capability to access and control the plurality of automated mobile robots 122 throughout the automated inventory management system 100. In particular, the central controller 116 is configured to manage locations and operation modes of the automated mobile robots 122 based on user preferences. The main operation modes of the automated mobile robots 122 include, but are not limited to replenishment, decanting, defragmentation, order fulfillment, storage, and delivery. As would be appreciated by one skilled in the art, the automated mobile robots 122 can also include modes of operation not related to the management of inventory. For example, the plurality of automated mobile robots 122 can be allocated as blocking robots to establish a safety zone within the automated inventory management system 100. Other examples of modes of operation can include an initialization mode, a standby mode, an idle mode, an active mode, an alarm mode, a disabled mode, a power off mode, a charging mode, a maintenance recall mode. The central controller 116 is configured to receive user input (e.g., from a user interface for the automated mobile robot storage and retrieval system 102) dictating how and where the automated mobile robots 122 should operate (e.g., mode of operation) and provides the instructions to automated mobile robots 122 for implementation of the user input. For example, the central controller 116 can receive user input with instructions to allocate automated mobile robots to perform certain tasks within the automated inventory management system 100. Additionally, the central controller 116 can receive instructions to allocate automated mobile robots 122 in response to a particular event (e.g., receives a customer order for automated fulfillment, receives new inventory at the replenishment section 206, etc.). In response to instructions and/or events, the central controller 116 will provide instructions to the automated mobile robots 122 to act accordingly with a particular combination of modes of operations and task demands, as discussed in greater detail herein.

Based on the modes of operations and task demands received by the automated mobile robots 122, the respective electromechanical systems within each of the automated mobile robots 122 will be initiated to perform the appropriate actions. For example, when an automated mobile robot 122 receives a task demand to travel to a designated location to perform an operation (e.g., tote 232 removal/storage) the power mechanisms are activated for controlling power supply to the propulsion system of each of the automated mobile robots 122 in a direction of the designated location. The main operations to be performed by the automated mobile robots 122 within the store 200, based on priority, include customer deliveries, customer order picking, replenishment, and defragmentation. For customer deliveries, the automated mobile robots 122 retrieve and consolidate customer totes for store employees to transfer to customers, or for direct customer retrieval. For order picking, the automated mobile robots 122 retrieve order totes, then product totes and bring them to the workstation 236 for order picking. The system 100 may request store employees to the picking workstations 236 based on system scheduling and order demand. For replenishment, the automated mobile robots 122 bring empty totes to a decanting station 254 for employees to load items into sub-totes, that are subsequently loaded into totes that are retrieved and stored by the automated mobile robots 122. Finally, when other activities have been completed, and based on empty sub-tote percentage in the system, the automated mobile robots 122 are commanded to take totes containing empty sub-totes to a defragmentation station 238, as discussed with respect to FIGS. 5A and 5B.

In accordance with an example embodiment of the present invention, the automated inventory management system 100 can include a plurality of user devices 124 configured to communicate with the automated mobile robot storage and retrieval system 102 over a telecommunication network(s) 126. The automated mobile robot storage and retrieval system 102 can act as a centralized host, for the user devices 124, providing the functionality of the central controller 116 sharing a secured network connection. As would be appreciated by one skilled in the art, the plurality of user devices 124 can include any combination of computing devices, as described with respect to the automated mobile robot storage and retrieval system 102 and the computing device 104. For example, the computing device 104 and the plurality of user devices 124 can include any combination of servers, personal computers, laptops, tablets, smartphones, etc. In accordance with an example embodiment of the present invention, the computing devices 104, 124 are configured to establish a connection and communicate over telecommunication network(s) 126 to carry out aspects of the present invention. As would be appreciated by one skilled in the art, the telecommunication network(s) 126 can include any combination of known networks. For example, the telecommunication network(s) 126 may be combination of a mobile network, WAN, LAN, or other type of network. The telecommunication network(s) 126 can be used to exchange data between the computing devices 104, 124, exchange data with the storage system 114, and/or to collect data from additional sources.

Figure 2A:
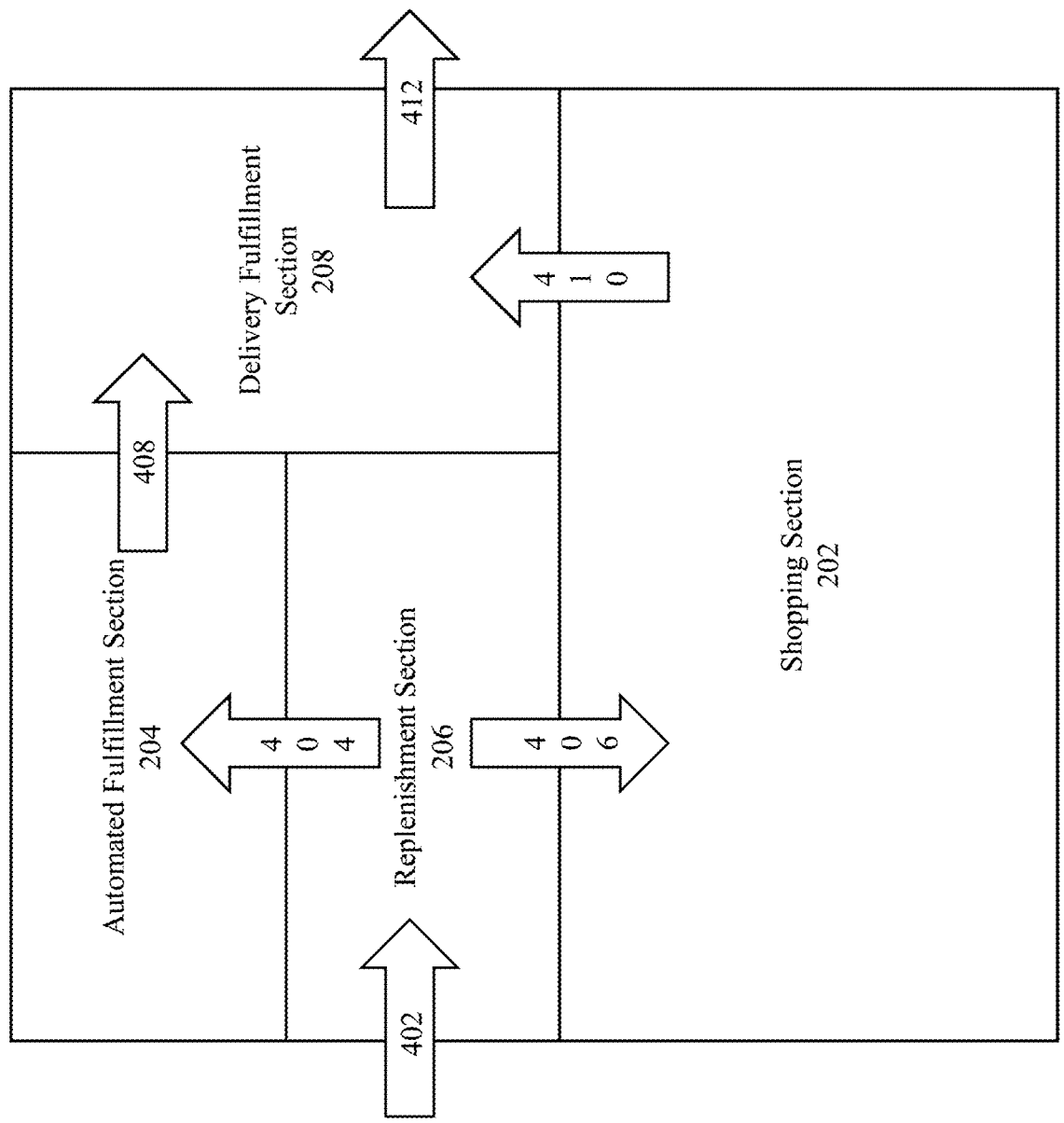
FIGS. 2A, 2B, 2C, 2D, 2E and 2F are diagrammatic representations of an automated store layout implementing the automated mobile robot storage and retrieval system of FIG. 1.

FIG. 2A depicts a representative conceptual internal layout of an automated store 200 implementing the automated inventory management system 100 in accordance with the present invention. In particular, FIG. 2A depicts the automated store 200 including a shopping section 202, an automated fulfillment section 204, a replenishment section 206, a delivery fulfillment section 208, and how each of the areas of the automated store 200 conceptually relates to one another. As would be appreciated by one skilled in the art, the automated store 200 is not limited to the areas defined in FIG. 2A and multiple areas can be combined into a single area. For example, the automated fulfillment section 204 can include multiple areas or zones that include a storage section, the replenishment section 204, and the delivery fulfillment section 208 all in a single area. Additionally, although the different areas represented in FIG. 2A are represented within a single plane, the areas can be divided on multiple floors of an automated store 200. During operation of the automated store 200, all transactions occur through one or more of these areas 202, 204, 206, 208 and/or sub-areas of those areas.

Figure 2B:
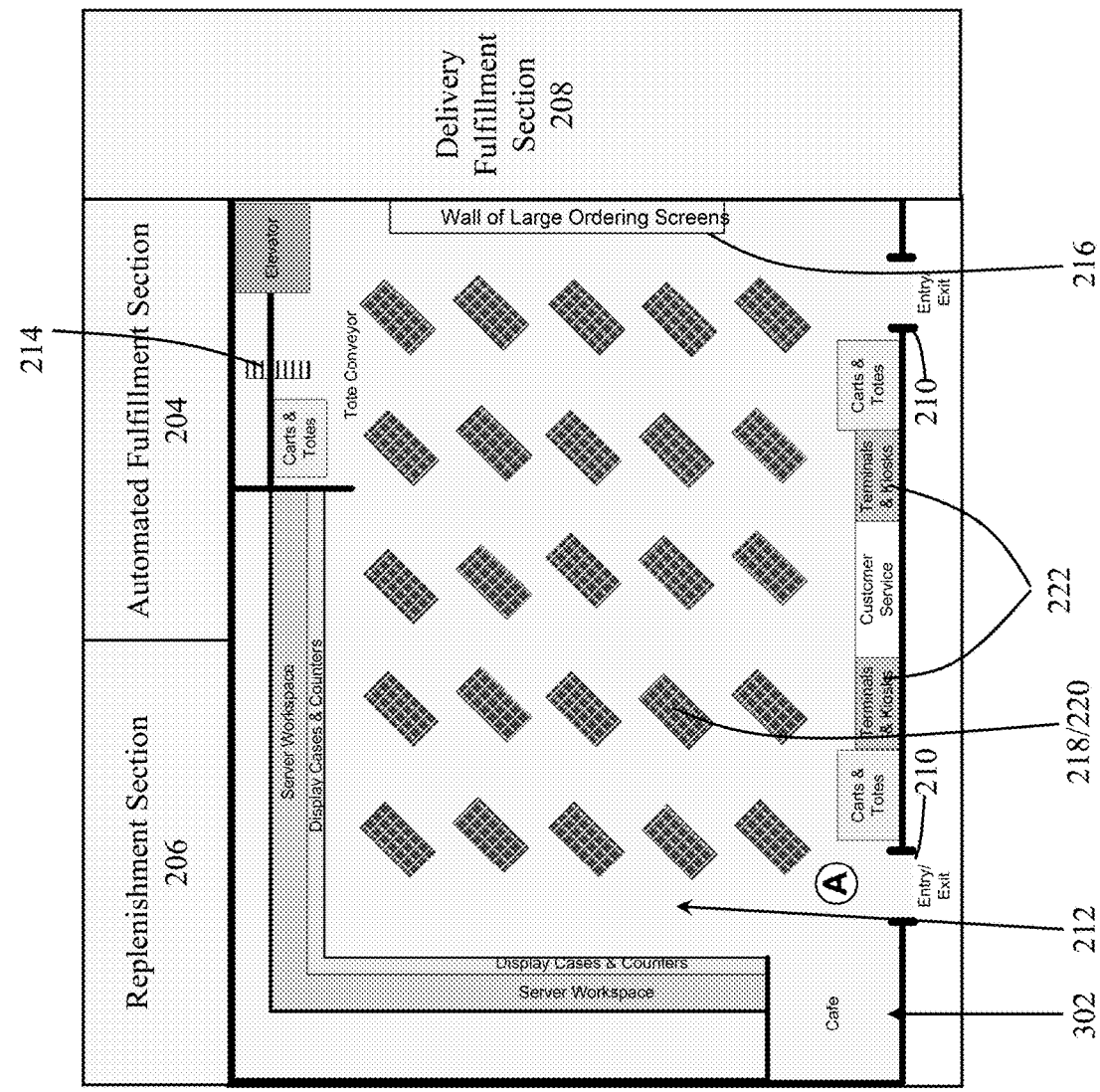

FIG. 2B depicts a diagrammatic illustration of the internal structure of the automated store 200, as discussed with respect to FIG. 2A. In particular, FIG. 2B depicts an exemplary view of the shopping section 202 and a conceptual relation of the shopping section 202 to the automated fulfillment section 204, the replenishment section 206, and the delivery fulfillment section 208. The shopping section 202, as depicted in FIG. 2B, includes entry and exit points 210, a mock marketplace 212, and a pass through 214 to the automated fulfillment section 204. The mock marketplace 212 includes a wall of ordering screens 216, a plurality of physical shelving units 218 and display cases of stands 220, and a plurality of shopping terminals and checkout kiosks 222. The checkout kiosks 222 include payment transaction facilitator enabling the customer to render payment for goods. The shopping section 202 includes "non-fungible" goods such as produce, meat, seafood, cheeses (primarily random-weight), deli, floral, bakery, and prepared foods. Typically, non-fungible goods will be sold from display fixtures or cases 218 with as many as three different pricing methods, including but not limited to "random dollar" (fungible with a price barcode), random weight (loose items, especially produce, priced based on item weight), and random count (loose items priced based on number of eaches). These non-fungible goods can also be sold at service counters that offer the customer more opportunity to customize ordered products according to their individual tastes and preferences. In accordance with an example operation, customers utilize the entrances 210 to enter and exit the shopping section 202 of the automated store 200. Once inside the shopping section 202 of the automated store 200, customers can place orders for fungible goods, on the ordering screens 216, to be fulfilled within the automated order fulfillment section 204 and can shop for non-fungible goods within the shopping section 202 that are combined with the fungible goods and delivered to the customer at the delivery fulfillment section 208.

Figure 2C:
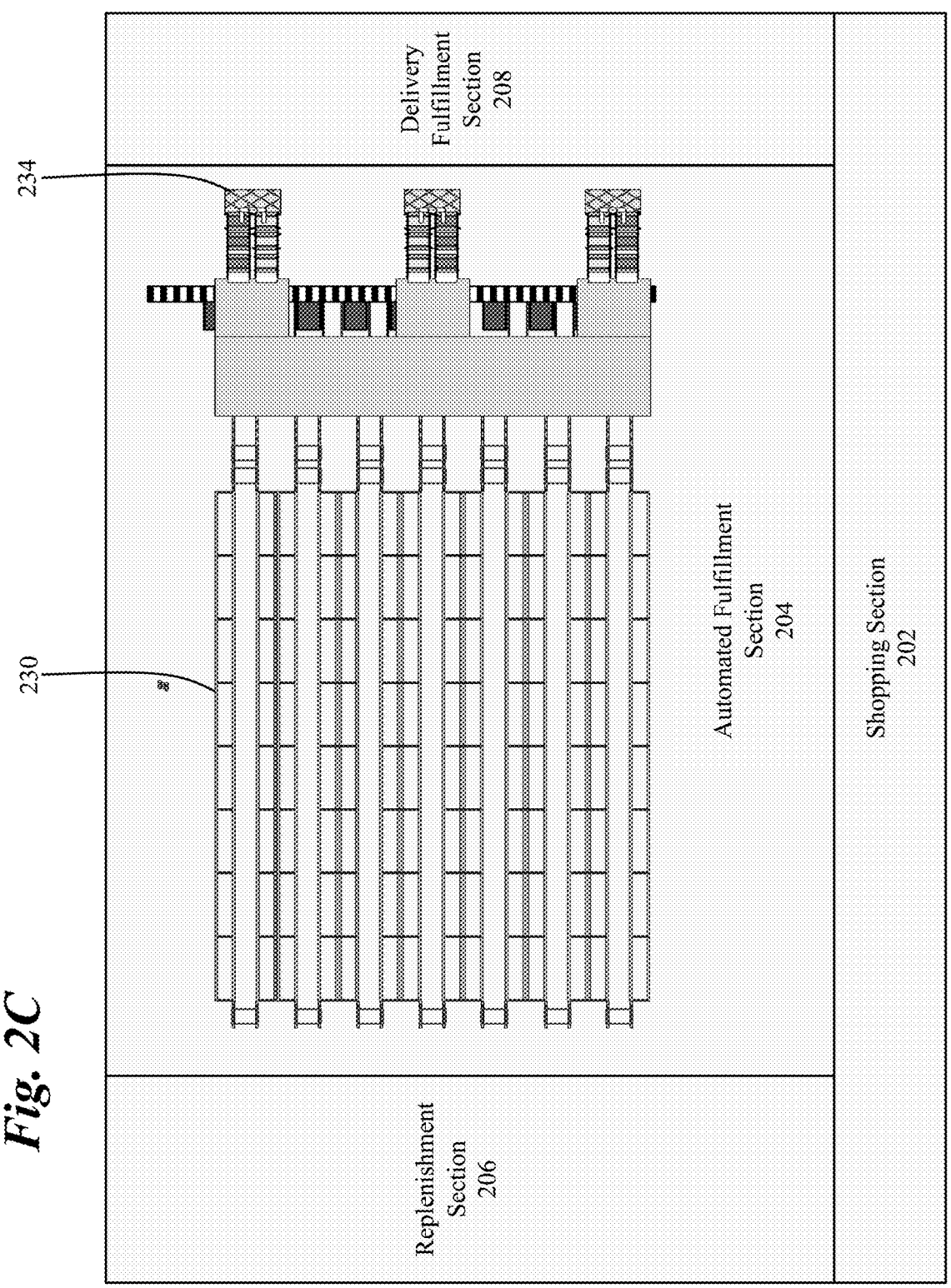

FIG. 2C depicts an exemplary view of the automated fulfillment section 204 and a conceptual relation of the automated fulfillment section 204 to the shopping section 202, the replenishment section 206, and the delivery fulfillment section 208. The automated fulfillment section 204 includes the storage rack 230 system configured to hold totes 232 of inventory accessible by the automated mobile robots 122 and further configured to enable the automated mobile robots 122 to pull inventory totes 232 and deliver the totes 232 to pickers 234 at picking workstations 236 for automated order fulfillment. In particular, the storage rack 230 includes a plurality of rack modules separated by aisles and having a plurality of storage levels, the storage rack 230 structure storing a plurality of totes 232 that are empty, contain eaches, or contain orders. The storage rack 230 is configured to enable the automated mobile robots 122 to propel themselves horizontally and vertically throughout the storage rack 230 structure. The automated mobile robots 122 are configured to place totes 232 into the storage rack 230 structure, remove totes 232 from the storage rack 230 structure, and transport totes 232. Additionally, the automated mobile robots 122 are configured to deliver the totes 232 to and from the picking workstations 236 and other areas 202, 206, 208 of the automated store 200. An example of such a system is described in greater detail in U.S. Pat. No. 9,139,363, U.S. Patent Application Publication No.

2014/0288696, and U.S. patent application Ser. No. 15/171, 802, all of which are incorporated by reference herein reference. During operation within the automated inventory management system 100, the automated mobile robots 122 traverse the different aisles and storage levels of the storage rack 230 structure to remove and replace the inventory totes 232, as instructed from the system 100.

In accordance with an example embodiment of the present invention, customer orders for fungible goods are fulfilled by an automated system within automated fulfillment section 204. When the order for automated fulfillment has been completed, the totes 232 containing the fungible goods picked by the automated mobile robots 122 and pickers 234 will be provided to the delivery fulfillment section 208 (e.g., via path 408). Similarly, when customers have completed picking non-fungible goods within the shopping section 202, the customers will provide the goods to the delivery fulfillment section 208 (e.g., via path 410 and the pass through 214). In accordance with an example embodiment of the present invention, the delivery fulfillment section 208 includes a consolidation section 240 in which goods from the automated fulfillment section 204 and goods from the shopping section 202 are combined and consolidated into order totes 232 for delivery to customers at one or more transfer stations 242, as depicted in FIG. 2D.

At the consolidation section 240 of the delivery fulfillment section 208, the fungible goods provided from the automated fulfillment section 204 and non-fungible "fresh goods" provided from the shopping section 202 will be combined into a single order for delivery to the customer at a transfer station 242. In particular, the consolidation section 240 includes a merge module that combines eaches of goods picked from the automated fulfillment section 204 with eaches of goods picked from the shopping section 202 deposited at the one or more goods drop-off transfer stations 242. The combined eaches of goods from both sections 202, 204 form a delivery bundle (e.g., one or more totes 232 of goods) and the automated mobile robots 122 transfer the completed delivery bundle to transfer station 242 which receives and stores a delivery bundle in a designated location until a customer arrives to take possession of the delivery bundle.

Figure 2D:
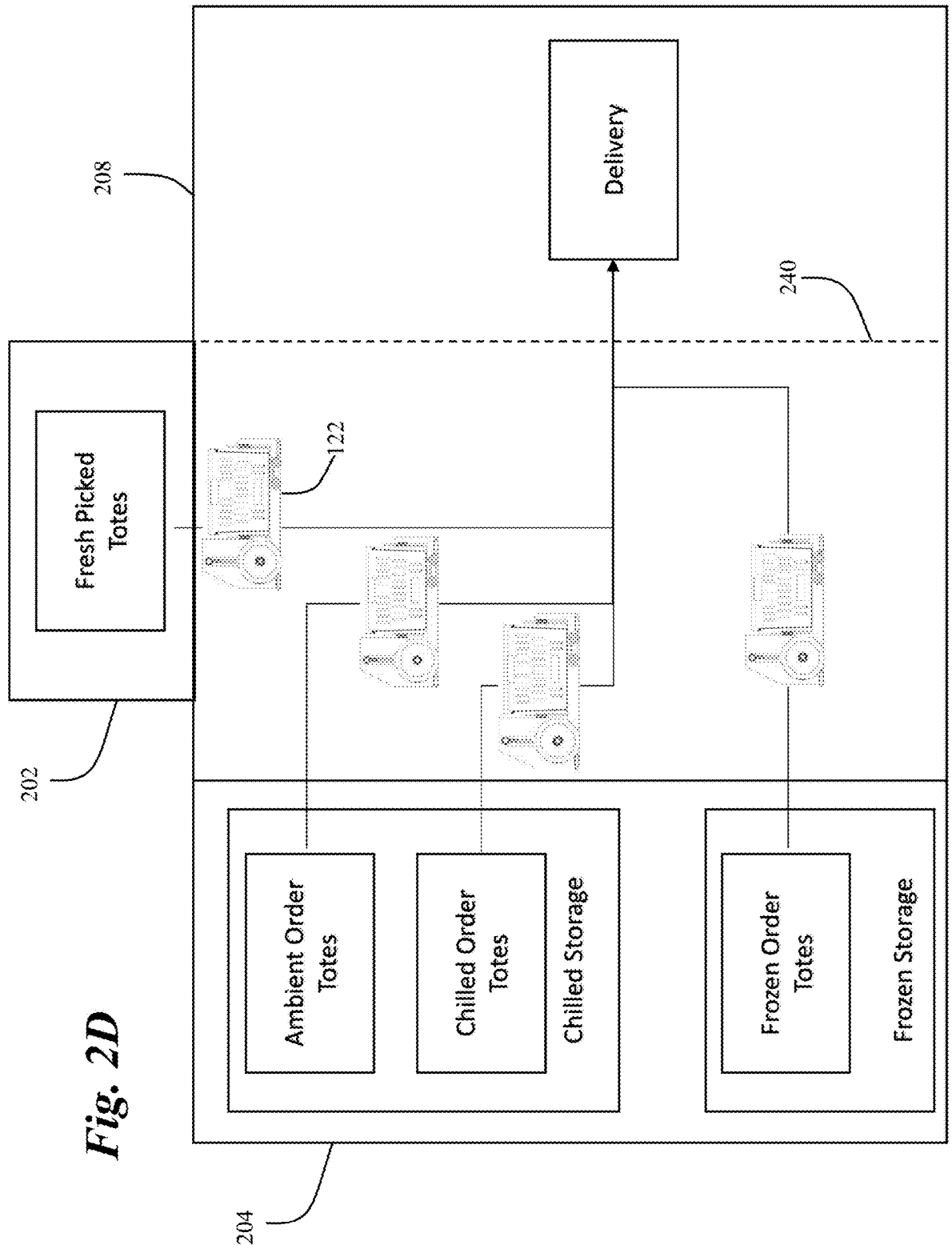

In accordance with an example embodiment of the present invention, during consolidation, a plurality of automated mobile robots 122 are tasked to retrieve totes 232 of goods from the various sections 202, 204, and transfer those totes 232 to the merge module of the consolidation section 240, as depicted in FIG. 2D. Based on the quantity of goods, one or more of the plurality of automated mobile robots 122 or one or more new automated mobile robot(s) 122 can retrieve the delivery bundle and transfer the bundle to the appropriate transfer station 242. Each of the tasks as it related to FIG. 2D is carried out within the delivery mode of operation with different task demands provided to each of the automated mobile robots 122 performing each specific task (e.g., delivering goods from the shopping section 202, delivering goods from the automated fulfillment section 204, delivering the completed delivery bundle to the transfer station 242, etc.). As would be appreciated by one skilled in the art, the consolidation can occur within the same physical space as the automated fulfillment section 204, the delivery section 208, or in a separate physical space.

Figure 2E:
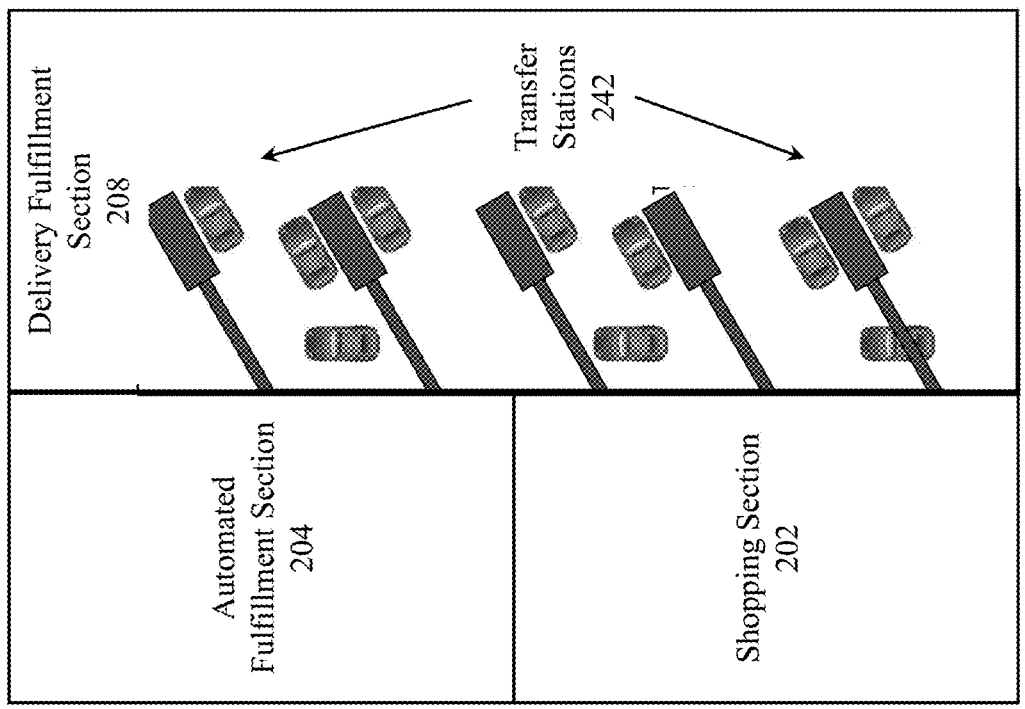
Figure 7A:
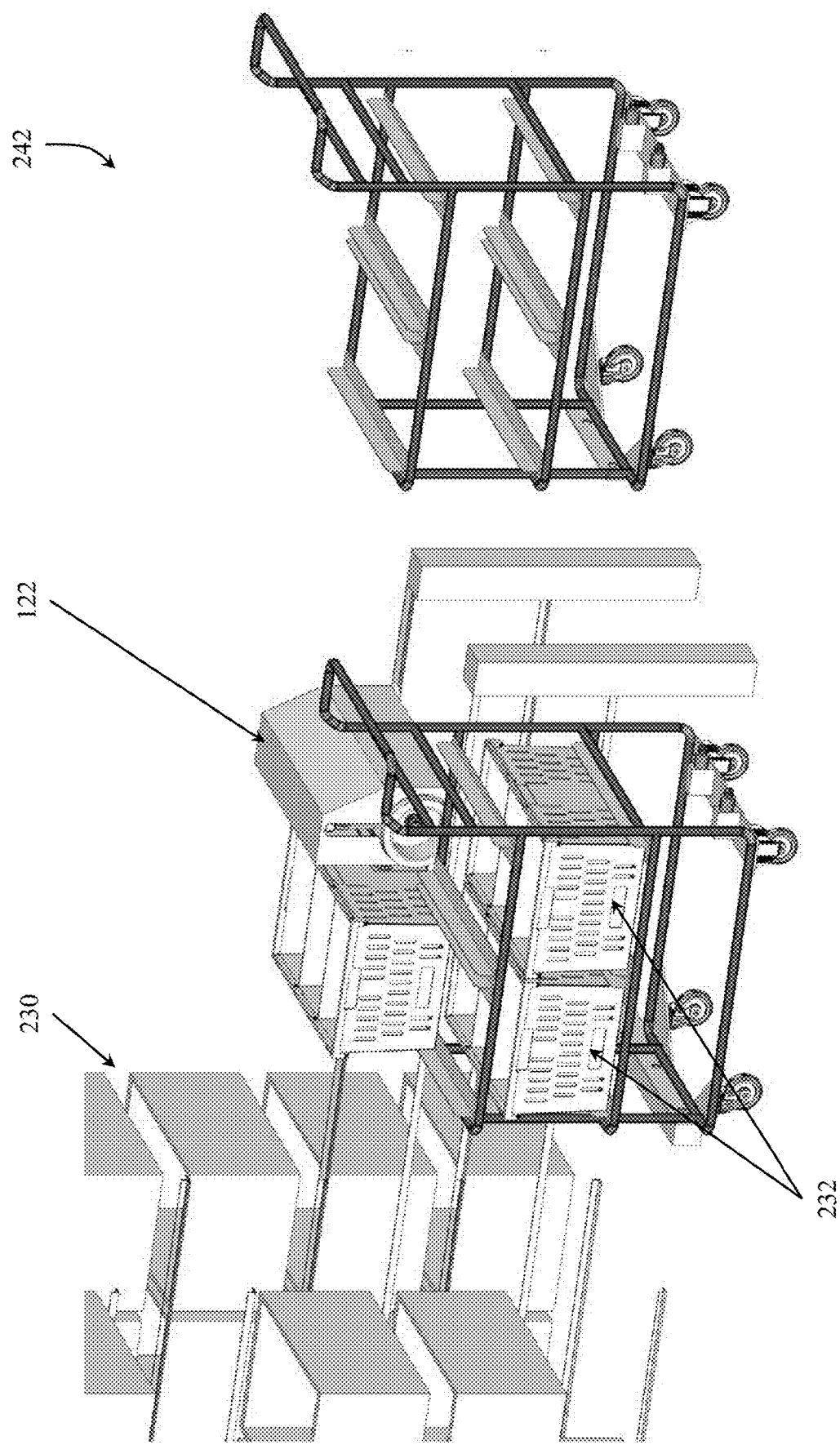
FIGS. 7A and 7B are illustrative depictions of transfer stations for use within an automated mobile robot storage and retrieval system.
Figure 7B:
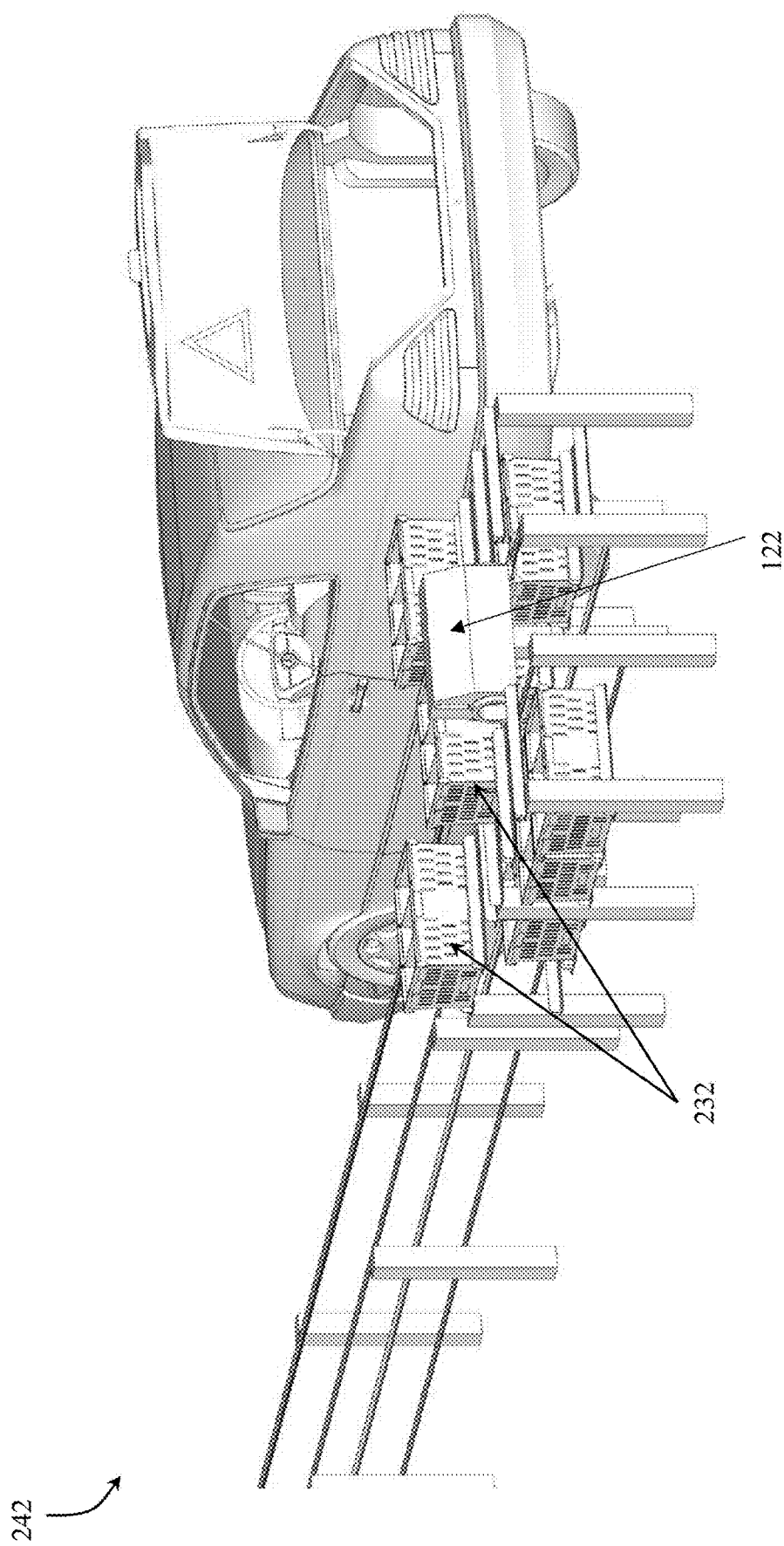

FIG. 2E depicts an exemplary view of the delivery fulfillment section 208 and a conceptual relation of the delivery fulfillment section 208 to the automated fulfillment section 204 and the shopping section 202. In accordance with an example embodiment of the present invention, the delivery fulfillment section 208 includes a plurality of transfer stations 242 configured for customers to pick-up their orders. The transfer stations 242 are configured for the delivery of the goods directly to a customer or customer vehicle in a variety of ways, as depicted in FIGS. 7A and 7B.

Figure 2F:
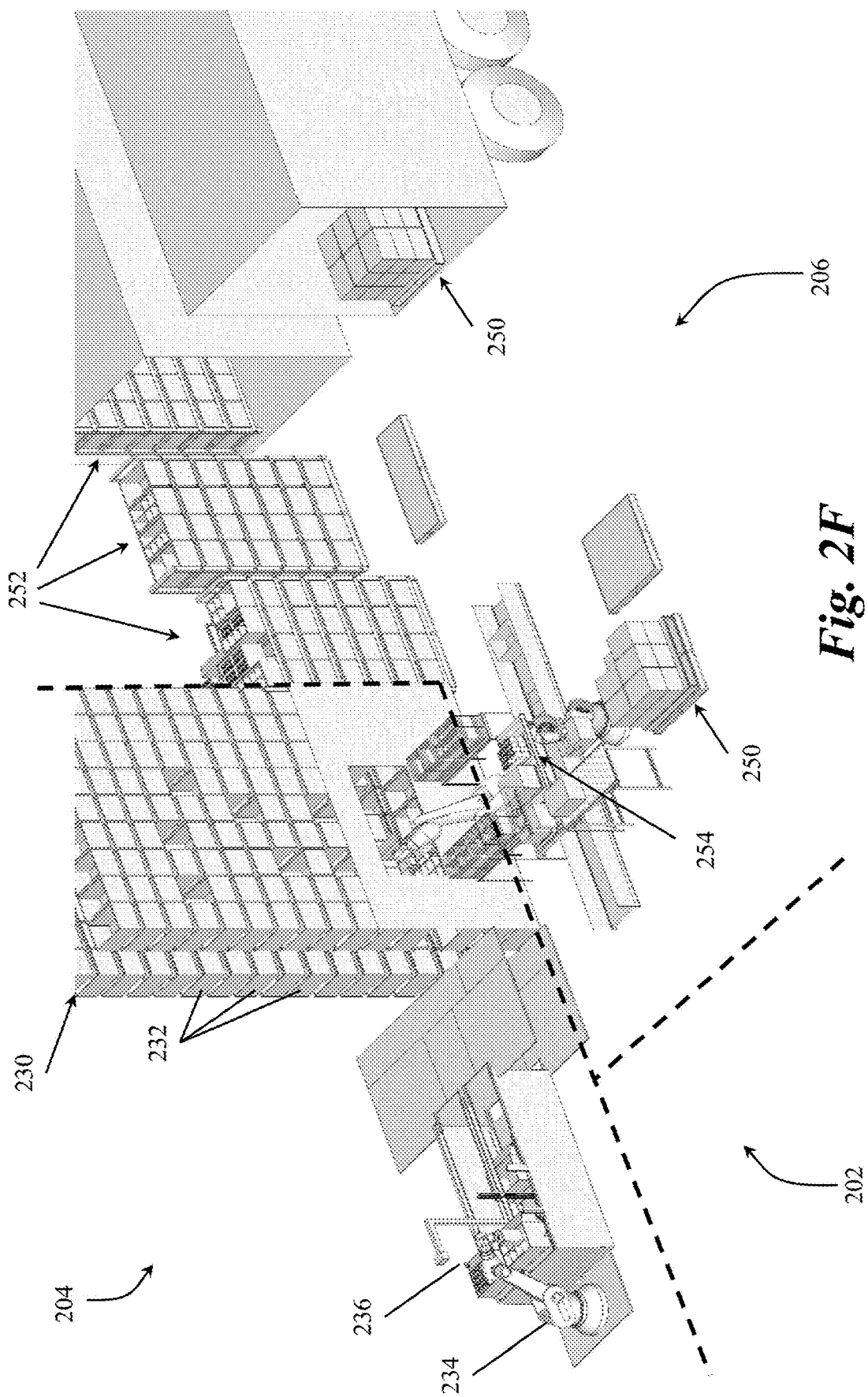

In accordance with an example embodiment of the present invention, the replenishment section 206 of the automated store 200 is configured to receive shipments of goods from various suppliers and/or manufacturers. The replenishment section 206 is included within a "back end" of the store that is not typically seen by customers. FIG. 2F depicts an exemplary view of the replenishment section 206 and the relation of the replenishment section 206 to the other sections of the automated store 200. In particular, FIG. 2F depicts the replenishment section 206 including a docking area for receiving cases of goods (e.g., via truck). In accordance with an example embodiment of the present invention, the cases of goods can be received either as pallets of cases 250 or as portable racks of totes 232 with goods stored therein. The portable racks 252 of totes 232 can be received from a distribution center designed for implementation with the automated store 200. An example implementation of such a distribution center is discussed with respect to U.S. Patent Application No. 62/427,652 filed on Nov. 29, 2016, incorporated by reference herein. Initially, regardless of shipping method, when goods are delivered to the replenishment section 206 the goods are identified as non-fungible goods for storage within the shopping section 202 or fungible goods for storage within the automated fulfillment section 204. Based on the determination of fungible goods or non-fungible goods, the received items will be allocated to the designated areas accordingly. In particular, the non-fungible goods will be transferred to the shopping section 202 (e.g., via path 406) and the fungible goods will be transferred (e.g., via path 404) and stored in a manner suitable for automated order fulfillment (e.g., stored in totes 232 and placed into the storage rack 230).

Figure 3:
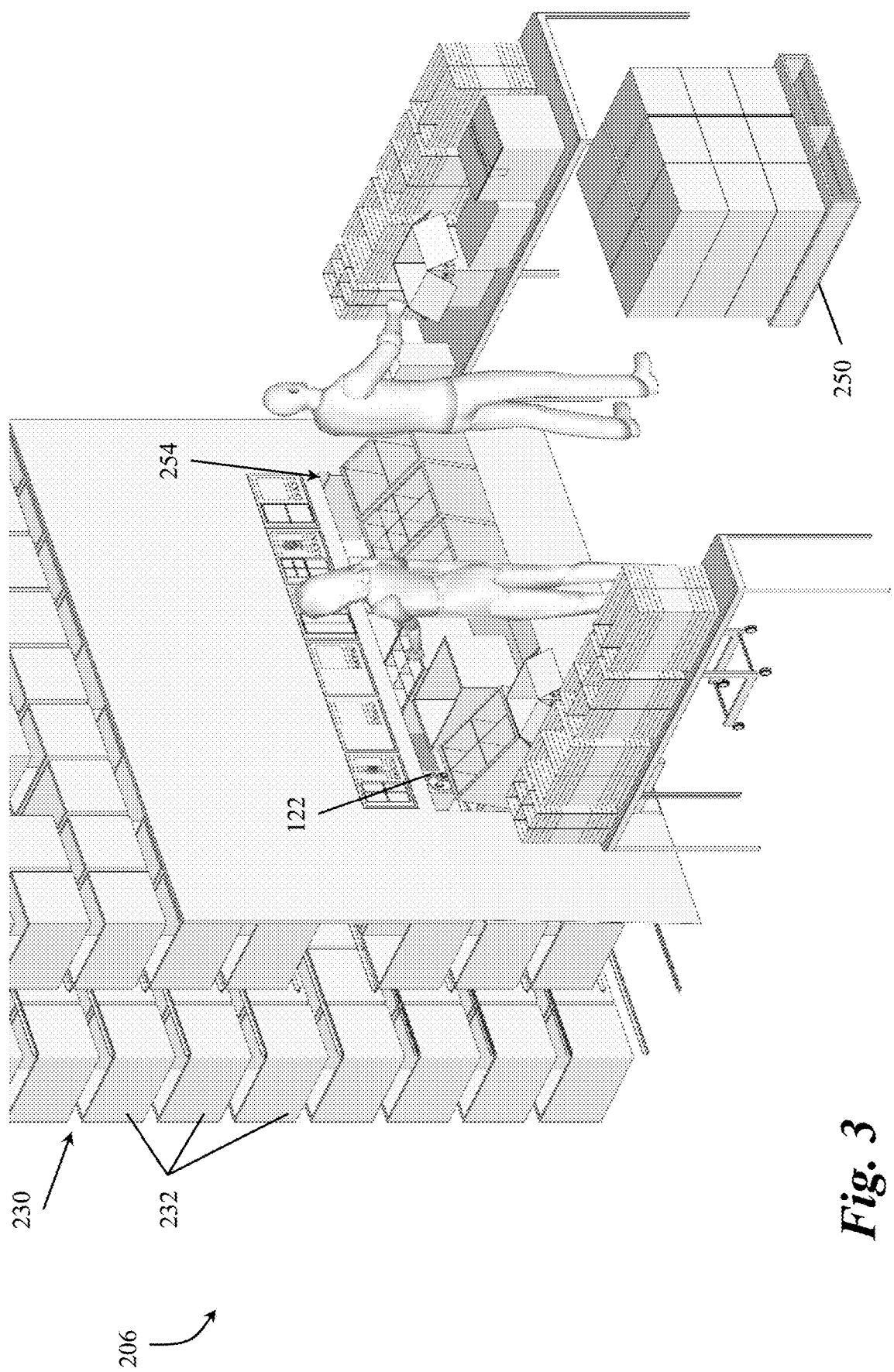
FIG. 3 is an illustrative depiction of a manual decanting station within the automated mobile robot storage and retrieval system.

As would be appreciated by one skilled in the art, depending on if the goods are received by pallets of cases 250 of portable racks 252 or totes, the items will be received into inventory of the automated fulfillment section 204 through different methodologies. For example, based on the type of delivery methodology, the goods will be received in the manner discussed with respect to FIGS. 3-4B. In accordance with an example embodiment of the present invention, the replenishment section 206 includes a decanting station 254 configured to replenish goods to the automated fulfillment section 204, as depicted in FIG. 3. The decanting station 254 can be utilized to replenish goods received from manufacturers, suppliers, and returns from customers. The decanting process includes transferring products from pallets of cases 250 and/or customer returns into totes 232 to be stored within the storage rack 230 of the automated fulfillment section 204.

Continuing with FIG. 2A, multiple pathways that the plurality of automated mobile robots 122 are configured to traverse during different modes of operation are depicted. The pathways include receiving new inventory at the replenishment section 206 via path 402, transferring inventory to the automated fulfillment section 204 for storage via path 404, transferring inventory to the shopping section 202 for storage via path 406, providing inventory from the automated fulfillment section 204 to the delivery fulfillment section 208 for order fulfillment via path 408 (e.g., fungible goods), receiving inventory from the shopping section 202 at the delivery fulfillment section 208 for order fulfillment via path 410 (e.g., non-fungible goods), and transporting fulfilled orders to a delivery destination via path 412 (e.g., customer vehicle, delivery vehicle, etc.). At each of the pathways 402, 404, 406, 408, 410, 412 at least one automated mobile robot 122 handles at least a part, if not all, of the transition. For example, at path 402 the automated mobile robots 122 can handle inventory of goods once the goods have been unloaded from a truck, either manually or through an automated process (e.g., at the decanting station 254). In another example, the automated mobile robots 122 can handle the inventory throughout the automated fulfillment section 204 as well as the transfer from the automated fulfillment section 204 to the delivery fulfillment section 208 at pathway 408. The responsibilities for each of the automated mobile robots 122 changes based on the area of the automated store 200 that the automated robots 122 are assigned as well as the task that they are assigned to perform within or between those areas. In accordance with an example embodiment of the present invention, the automated store 200 is laid out such that locations within the store 200 are accessible from at least two paths to prevent single points of failure within the system 100.

In operation, the automated mobile robots 122 are configured to assist and/or carry out various operations throughout the automated store 200. Each of the various operations is carried out by allocating (e.g., via the central controller 116) the automated mobile robots 122 in one or more modes of operation. The modes of operation include, but are not limited to, a replenishment mode, a defragmentation mode, an order fulfillment mode, and a delivery mode. The replenishment mode includes receiving eaches of goods and depositing the eaches of goods in designated storage totes and/or storage locations within the storage rack 230, the defragmentation mode includes organizing totes 232 and consolidating sub-totes stored within totes 232, the order fulfillment mode includes retrieving order totes from the storage rack 230 and delivering the order totes to the delivery section 208, and the delivery mode includes receiving delivery bundles and transporting the delivery bundles to designated locations at the pick-up transfer stations 242. In accordance with an example embodiment of the present invention, each of the different modes of operation is executed by an automated mobile robot 122 of the same design. In other words, a single automated mobile robot 122 is capable of carrying out the tasks required by each of the modes of operation without modification.

In accordance with an example embodiment of the present invention, the totes 232 are interchangeable and are designated with different identifiers for the automated mobile robots 122 and the system 100. That is, while the totes 232 are the same structurally such that they are interchangeable in the tasks that the totes 232 can be utilized for based on the designation associated therewith. The totes 232 are designated based on their capacity as well as the mode of operation in which they are being utilized. In particular, the interchangeable totes 232 are designated as empty storage totes when empty (e.g., no items included therein), designated as storage totes 232 or product totes 232 when containing eaches of goods (e.g., inventory), designated as order totes when containing eaches of goods for customer orders, or combinations thereof. In operation, the system 100 provides the designations and the designations assist the automated mobile robots 122 to identify which totes 232 are to be utilized for which mode of operation. For example, if an automated mobile robot 122 is instructed to retrieve and empty tote 232 as part of a mode of operation, the automated mobile robot 122 will know or be instructed to the location of a tote 232 designated as an empty tote(s) 232.

In accordance with an example embodiment of the present invention, the central controller 116 can identify and track the locations of all the automated mobile robots 122, the totes 232, the respective designations (e.g., modes or operation or tote designation) in the system 100 and eaches within each sub-totes contained within each tote 232. The identification of the locations for all of the automated mobile robots 122 and totes 232 can further be utilized by the central controller 116 when allocating automated mobile robots 122 to different modes of operations. In particular, the central controller 116 can identify all of the automated mobile robots 122 that are located within a particular section and instruct those automated mobile robots 122 to perform a particular mode of operation within that section. The central controller 116 attempts to level-load the automated mobile robots 122 to ensure all necessary store 200 operations are completed with the fewest number of automated mobile robots 122.

When the central controller 116 wants to assign a mode of operation to one or more automated mobile robot(s) 122, the central controller 116 will transmit a task demand to the one or more automated mobile robot(s) 122, instructing what tasks to carry out in accordance with a mode of operation. In particular, the task commands include instructions related to a destination and picking or placing a tote at the destination. Additionally, the task demand can include specifying one or more totes 232 to utilize during the mode of operation and the origination/destination locations for the one or more totes 232. As would be appreciated by one skilled in the art, although the present invention is discussed with respect to providing instructions, demands, etc. via the central controller 116, some or all of the control elements may be distributed throughout the system 100 including logic stored within the automated mobile robots 122 themselves.

In accordance with an example embodiment of the present invention, the replenishment mode includes an automated mobile robot 122 propelling itself through the storage rack 230, delivering a partially filled or empty tote 232 to the decanting station, receiving a tote 232 (e.g., a storage tote or product tote) with goods for replenishment, and/or transporting the replenished tote 232 of goods to a storage location within the storage rack 230. As would be appreciated by one skilled in the art, the totes 232 are interchangeable and can be utilized within the modes of operation interchangeably, such that product totes can be utilized for replenishment, storage, and delivering product to workstations for order fulfillment. The particular tote designation relates to the function the tote is performing at the time, based at least in part on the contents of the tote. When operating in replenishment mode, the automated mobile robot 122 will receive multiple task demands related to where to traverse for receiving the tote 232 of goods for replenishment, where to traverse to deposit the replenished tote 232 of goods within the storage rack 230. As would be appreciated by one skilled in the art, the task demands will repeat these steps for each new tote 232 for replenishment.

Additionally, depending on how the goods are provided at the replenishment section 206, the automated mobile robots 122 may execute the same mode of operation in a different manner as influenced by different task demands. For example, the mobile robots 122 will be instructed to traverse different sections within the replenishment section 206/automated fulfillment section 204 when receiving goods originating from pallets of cases 250 than when receiving goods originating from portable racks 252 of totes 232. FIG. 2F depicts how the initial location for receiving totes 232 for replenishment will vary based on shipping methodology. In particular, when goods are received via pallets of cases 250, the pallet of cases 250 will be unloaded, either through an automated process or via a human operator, and transported to a decanting station 254.

When the pallet(s) of cases 250 are delivered at the decanting station 254, pickers 234 will remove eaches of items from the cases of goods on the pallets, as instructed by the system 100, and insert them into a combination of totes 232 and sub-totes stored within the totes 232, as depicted in FIG. 3. The picker 234 will continue to fill eaches of goods into sub-totes stored within a tote 232 until the tote 232 reaches capacity (e.g., filled with a maximum number of sub-totes). FIG. 3 shows a manual decanting workstation with human pickers 234, however, as would be appreciated by one skilled in the art, the picker 234 can be an automated robot picker. As would be appreciated by one skilled in the art, each pallet of cases 250 can vary in dimensions and quantity of cases (and eaches of goods contained therein). For example, standard pallets can include, but are not limited to, a North American pallet, a European pallet, an Australian pallet, or an Asian pallet, with each standard being configured to hold a different quantity of cases. Additionally, in accordance with an example embodiment of the present invention, the totes 232 are sized, dimensioned, and configured to fit on a standard pallet to act as the cases of goods. For example, a North American pallet is dimensioned approximately at 1.2 m by 1.2 m and the totes 232 can by dimensioned at 600 mm by 400 mm by 300 mm to fit on the 1.2 m by 1.2 m pallets.

In accordance with an example embodiment of the present invention, the sub-totes are sized, dimensioned, and configured to fit within the totes 232 in a combination to fill an entire inner volume of the totes 232. The sub-totes are sized and dimensioned as ¼ sub-totes, ½ sub-totes, and/or ¾ sub-totes to take up ¼, ½, and/or ¾ of the inner volume of the totes 232, respectively. For example, a tote 232 can hold two ¼ sub-totes and one ½. As would be appreciated by one skilled in the art, any size sub-tote configured to fill an inner volume of the totes 232 can be utilized without departing from the scope of the present invention. When a tote 232 has reached capacity (e.g., filled with sub-totes containing eaches of goods), a mobile automated robot 122 will receive a task demand to traverse to the decanting station 254 and pick-up the tote 232 and transport that tote 232 to a designated storage location within the storage rack 230 for later retrieval (e.g., to fill an order).

Figure 4A:
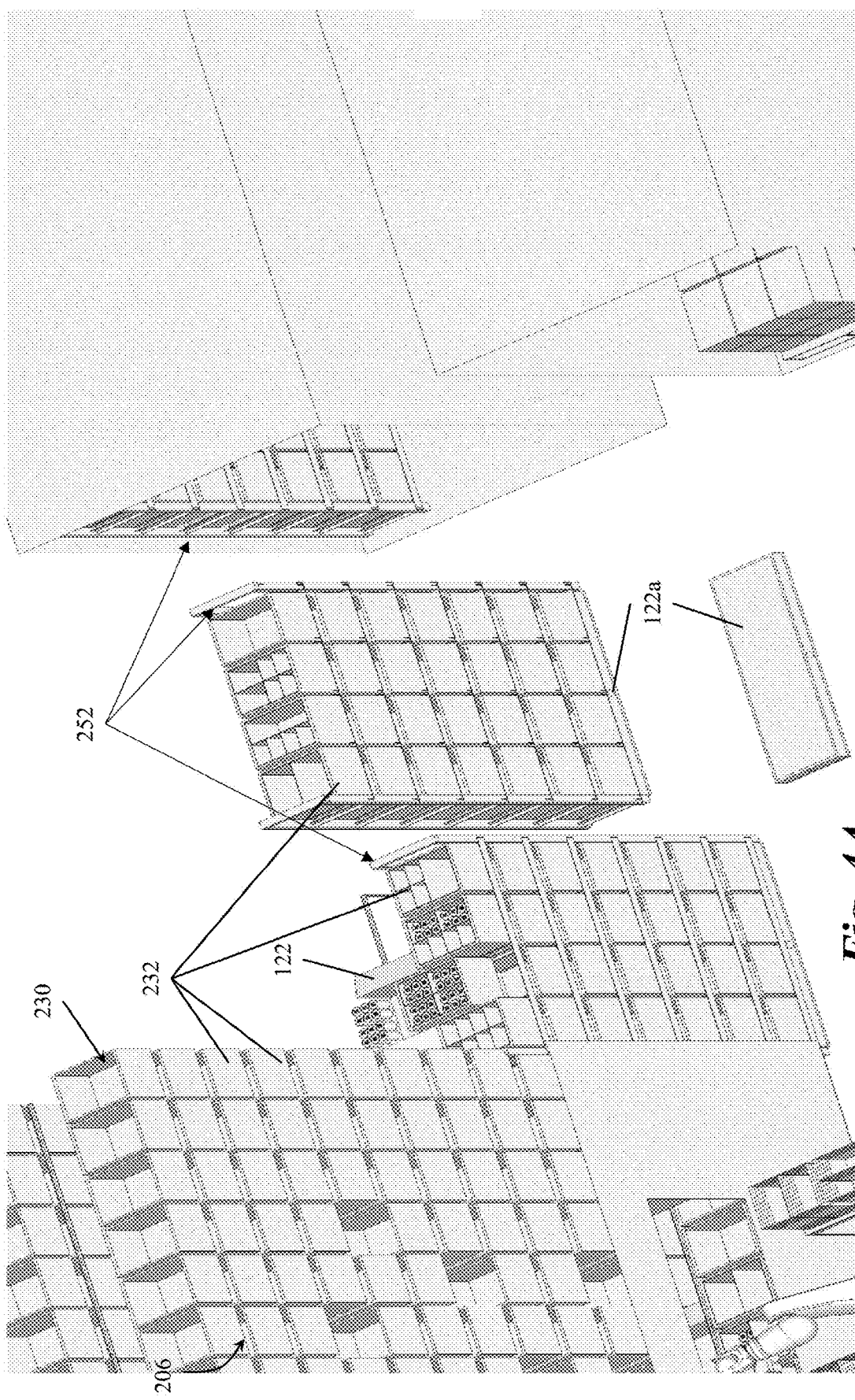
FIGS. 4A and 4B are illustrative depictions of a portable racks of totes for use within the automated mobile robot storage and retrieval system.
Figure 4B:
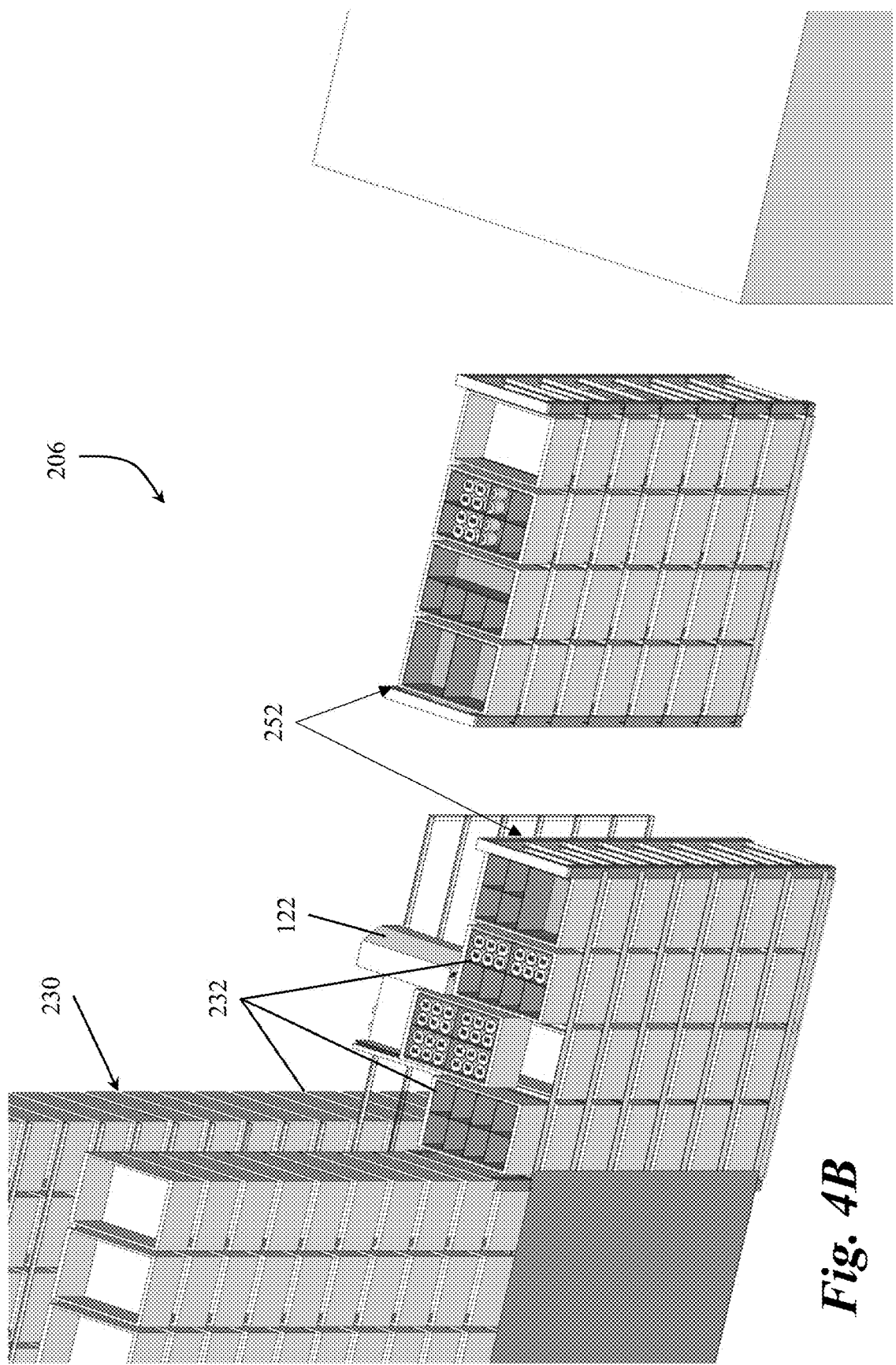

In accordance with an example embodiment of the present invention, when the goods are received via portable racks 252 of totes 232, the replenishing process is less labor intensive. In particular, the portable racks 252 of totes 232 are unloaded from a vehicle, either through an automated process or via a human operator, adjacent to a storage rack 230. When positioned adjacent to a storage rack 230, an automated mobile robot 122 will receive a task demand to traverse to the portable rack 252 of totes 232 and pick-up a designated tote 232 and transport that tote 232 to a designated storage location within the storage rack 230, as depicted in FIGS. 4A and 4B. In particular, FIGS. 4A and 4B show implementations that do not require the usage of a decanting station 238 and pickers 234. FIG. 4A shows a portable rack 252 of totes 232 temporarily affixed to the storage rack 230 structure, a portable storage rack 252 being transported to/from a truck, and a portable storage rack 252 located within a truck destined for a retail store (from left to right). Additionally, FIG. 4A shows an automated mobile robot 122 transferring a loaded tote 232 to/from the portable rack 252 temporarily affixed to the storage rack 230.

In accordance with an example embodiment of the present invention, the portable storage racks 252 are transported using a mobile rack robot 122*a* that are configured to move the portable storage racks 252, as depicted in FIGS. 4A and 4B. In particular, the mobile rack robot 122*a* positions itself underneath the portable storage rack 252, lifts the portable storage rack 252 slightly, and uses computer navigation (e.g., via task demand) to move the portable storage rack 252 to a destination (e.g., a storage rack 230). The mobile rack robot 122*a* is capable of entering the space underneath the portable storage rack 252 either between its support legs at its narrow end, or between its support legs along its length. The mobile rack robot 122*a* may alternatively be controlled by a human operator. As would be appreciated by one skilled in the art, the portable storage rack 252 may alternatively be manually transported on wheels attached to it, or using a human-guided wheeled lift.

Once at the automated store 200, the portable storage rack 252 is removed from a truck and affixed to the storage rack 230 structure at the store 200. For example, the portable storage rack 252 can be affixed utilizing registration features such as registration pins or kinematic couplings may be positioned at the bottom of the rail structure to correctly position the portable storage rack to the rail structure and storage rack 230 structure. The rail structure and storage rack 230 structure at the automated store 200 contain the same registration features to permit the portable storage rack 252 to be quickly and accurately aligned with it, and totes 232 can be transferred into the storage rack 230 structure by the automated mobile robots 122.

In accordance with an example embodiment of the present invention, the modes of operation include an automated decanting mode in which the automated mobile robots 122 are instructed (e.g., via task demand) to transfer totes 232 with sub-totes containing eaches from the portable storage rack 252 to the static storage rack 230 structure of the store 200. The automated decanting mode includes the automated mobile robots 122 pulling full totes 232 from the portable storage rack 252 and either delivering the totes 232 to a decanting station 254 or placing the totes 232 directly into storage rack 230, as instructed by the system 100. FIG. 4B shows the rail structure that the automated mobile robots 122 travel on when placing or picking totes 232 from the portable storage racks 252. After the incoming full totes 232 have been transferred from the portable storage rack 252 to the storage rack 230 structure, the empty totes 232 (with or without empty sub-totes) can be transferred onto the portable storage rack 252 for transport back to a distribution center (e.g., an automated distribution center).

In accordance with an example embodiment of the present invention, the modes of operation include a defragmentation mode that also takes place within the automated fulfillment section 204 and/or the replenishment section 206. The defragmentation process is designed to optimize the usage of the totes 232 and sub-totes stored therein. In particular, the defragmentation process optimizes inventory by reconfiguring partially empty totes 232 (e.g., totes 232 with one or more empty sub-totes stored therein) to fill some of the particularly filled totes 232 and create some empty totes 232, freeing them up for other uses (e.g., as order totes 232). During defragmentation, the decanting station 254 and/or the picking workstations 236 can be utilized for defragmentation of the inventory.

When an automated mobile robot 122 is in the defragmentation mode, the automated mobile robot 122 receives a task demand to deliver one or more interchangeable totes 232 to a decanting station 254 or picking workstation 236 to have the one or more sub-totes re-arranged within the one or more interchangeable totes 232. The delivering includes traversing the storage rack 230 to a particular tote 232 located in the storage rack 230 structure, removing the particular tote 232 from the storage rack 230 and traversing the storage rack 230 to a particular decanting station 254 or picking workstation 236 for defragging. When at the decanting station 254 or picking workstation 236, the one or more sub-totes are re-arranged by removing one or more sub-totes from one tote 232 (e.g., a tote 232 to be emptied) to another tote 232 (e.g., a tote 232 to be filled to capacity. The defragmentation process continues removing one or more sub-totes from totes 232 that are partially filled and placing the one or more sub-totes into other storage totes that are partially filled until the other storage totes are completely filled, in such a way that consolidates the one or more sub-totes and creates empty totes out of previously partially filed storage totes.

Figure 5A:
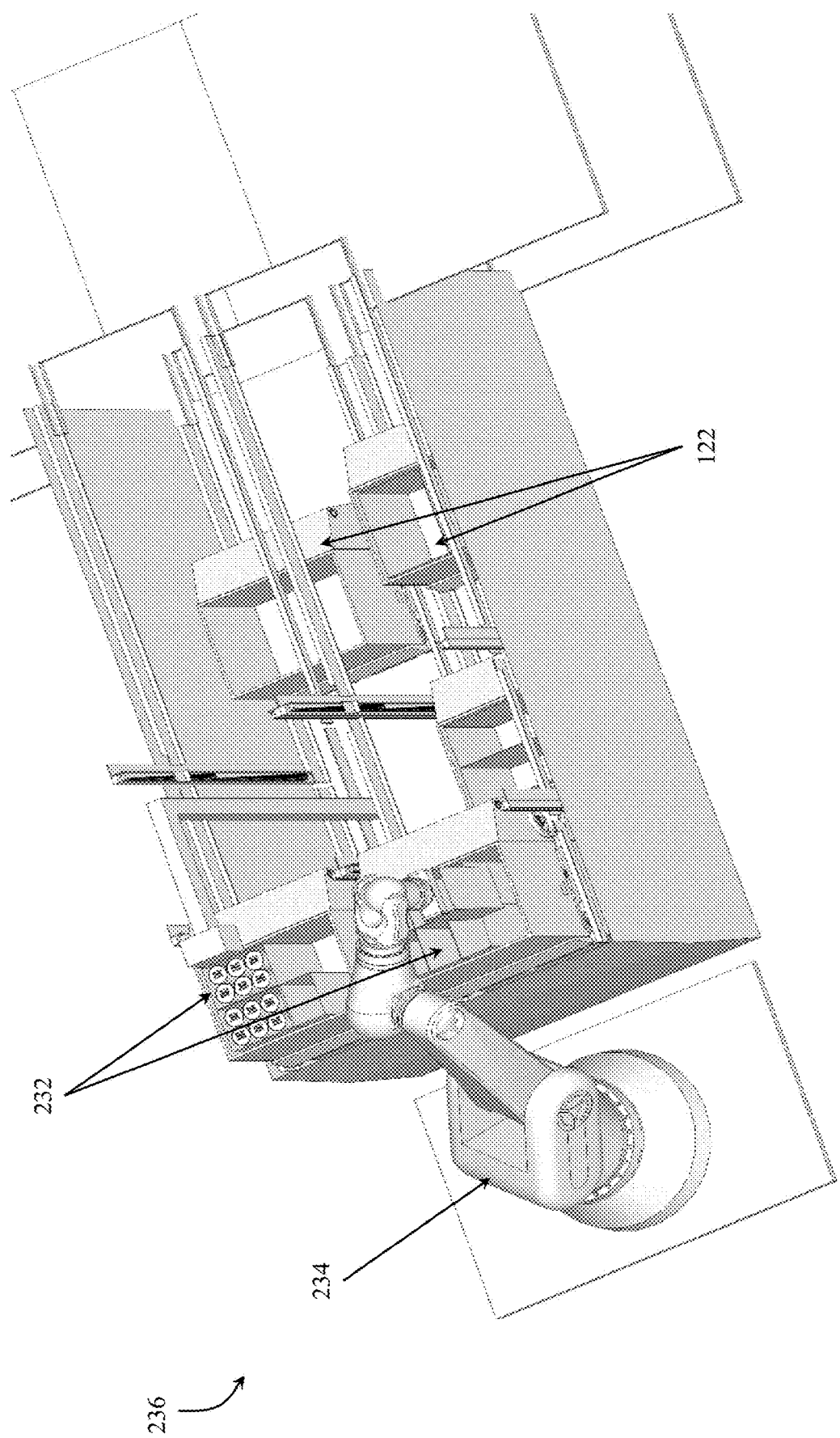
FIGS. 5A and 5B are illustrative depictions of defragmentation stations for use within the automated mobile robot storage and retrieval system.

FIG. 5A depicts an exemplary defragmentation process being fulfilled at a decanting station 254 or picking workstation 236. In particular, FIG. 5A depicts a plurality of automated mobile robots 122 delivering and removing partially filled totes 232 and empty totes 232 respectfully from the decanting station 254 or picking workstation 236 for defragmentation. The defragmentation process is fulfilled by a picker 234 which handles the removal and placement of sub-totes between the partially filled totes 232. As would be appreciated by one skilled in the art, the picker 234 can be a human operator, an automated robot (as depicted in FIG. 5A), or combination thereof.

Figure 5B:
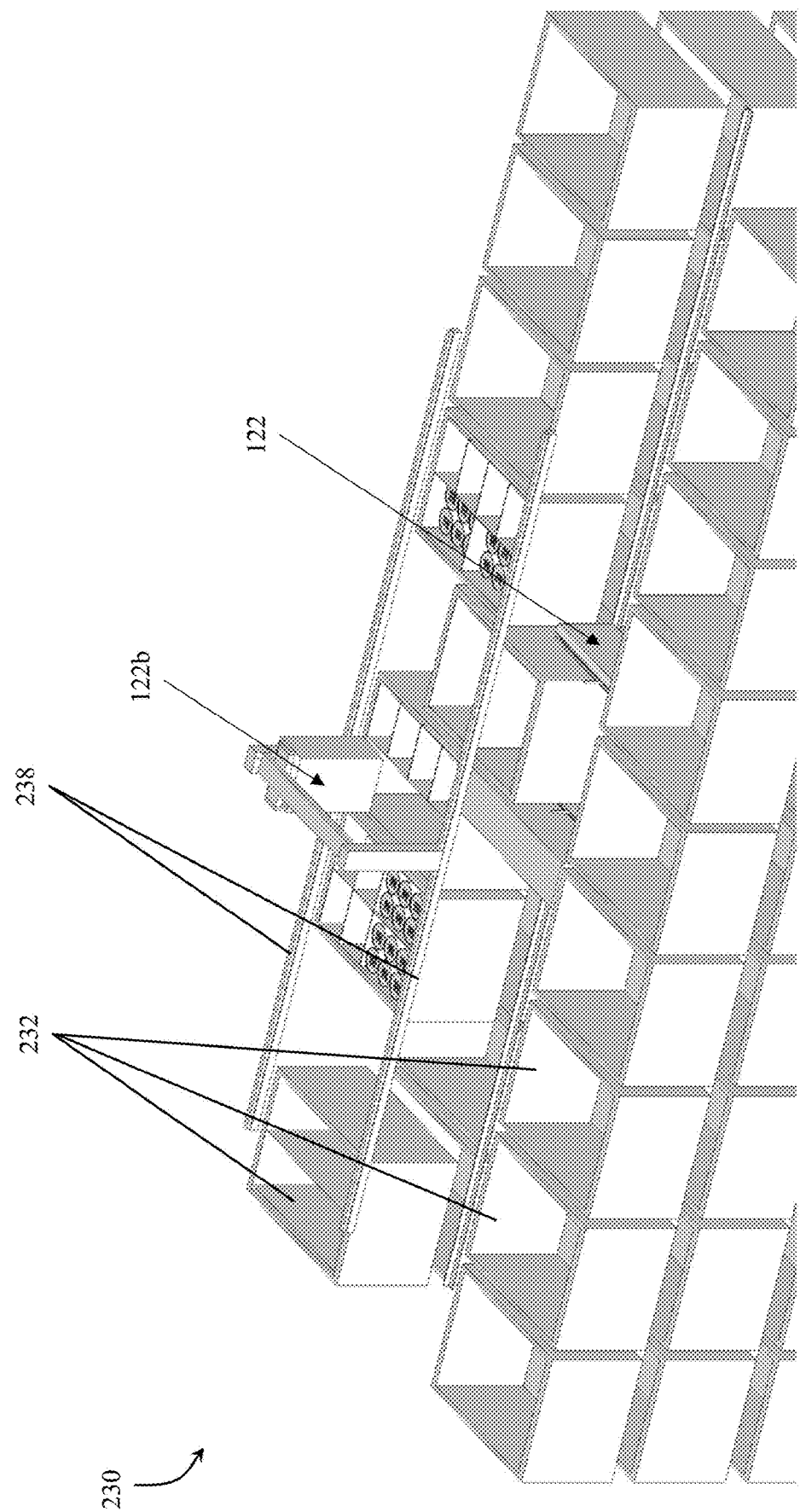

In accordance with an example embodiment of the present invention, the defragmentation mode of operation of the automated mobile robots 122 can include a different course of operation or set of task demands. In particular, the automated mobile robots 122 can receive task demands to shuffle in and out partially filled totes 232, filled totes 232, and empty totes 232 from within a designated automated defragmentation station 238 within the storage rack 230. FIG. 5B depicts an exemplary example of a automated defragmentation station 238. In particular, FIG. 5B depicts the automated defragmentation station 238 on an upper row of the storage rack 230 which allows the automated mobile robots 122 to traverse adjacent to the automated defragmentation station 238 to place and remove totes 232 for defragmentation. Additionally, the automated defragmentation station 238 is configured with rails enabling lateral movement by a Cartesian robot 122b configured to remove and place sub-totes stored within totes 232 placed within the automated defragmentation station 238, as depicted in FIG. 5B. The automated defragmentation station 238 and the Cartesian robot 122b, combined with the tote 232 retrieval of partially fill totes 232 and removal of full and empty totes 232 by the automated mobile robots 122 creates a fully automated defragmentation process. As would be appreciated by one skilled in the art, the automated defragmentation station 238 can also be utilized to decant goods between totes 232 received via a portable storage rack 252.

In accordance with an example embodiment of the present invention, the defragmentation mode of operation of the automated mobile robots 122 can include instructing the plurality of automated mobile robots 122 to distribute and re-organize totes 232 within the storage rack 230 itself. For example, the totes 232 can be organized and distributed to reduce travel time to retrieve different eaches or goods, empty totes, etc. The distribution and re-organization of totes 232 can be dictated by the types of eaches stored within the totes 232, for example. Based on the items within the totes 232, the totes 232 can be transported and stored by the automated mobile robots 122 within different areas of the storage rack 230. For example, ambient temperature items will be stored in a different area than items that need to be chilled or frozen. As would be appreciated by one skilled in the art, the defragmentation process can further include allocating sub-totes within the totes 232 according to similar logic. For example, sub-totes with frozen items will not be stored in the same tote 232 with sub-totes containing ambient temperature items. Additionally, other optimizations of sub-totes can be implemented. For example, the system 100 will never combine eaches from different cases into a sub-tote (e.g., according to lots, expiration, etc.)

Figure 6B:
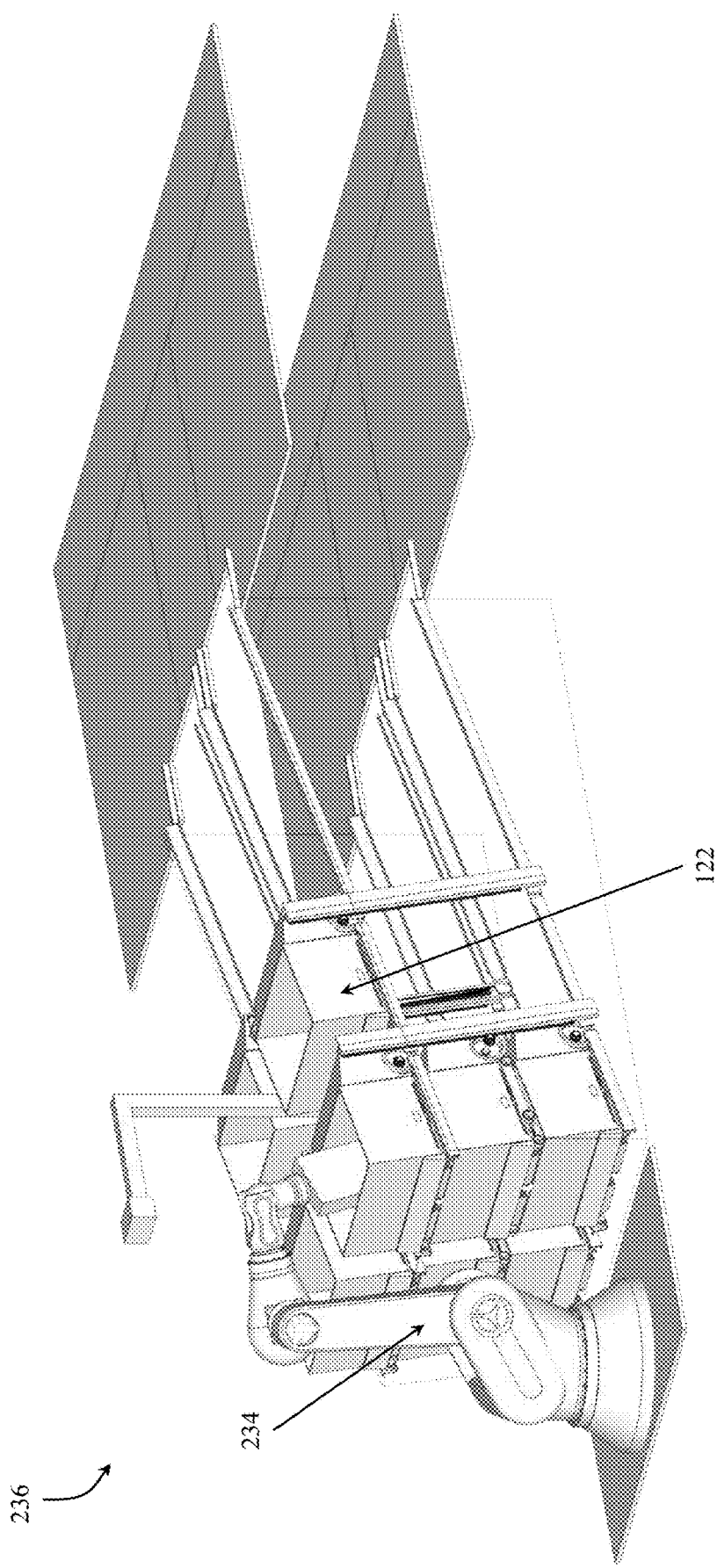

In accordance with an example embodiment of the present invention, the modes of operation include an order fulfillment mode. When the automated mobile robot 122 is designated and operates in the order fulfillment mode, the automated mobile robot 122 propels itself through the storage rack 230 structure of the automated fulfillment 204 section, placing totes 232 into the storage rack 230 structure, removing totes 232 from the storage rack 230 structure, and transporting totes 232 throughout the storage rack 230 to various destinations coupled to the storage rack 230 structure (e.g., the picking workstations 236, the defragmentation stations 238, the decanting station 254, etc.). In particular, the automated mobile robots 122 deliver the totes 232 (e.g., empty totes and product totes/storage totes, etc.) required during automated order fulfillment to a picking workstation 236 as shown in FIGS. 6A and 6B. During the order fulfillment mode one or more of the plurality of automated mobile robots 122 receive task demands to retrieve one or more totes 232 containing sub-totes containing eaches (e.g., product totes/storage totes) from the storage rack 230 and delivery the product totes 232 to a designated picking workstations 236. Prior to or contemporaneous with the retrieval of one or more product totes 232 another automated mobile robot 122 receives a task demand to retrieve one or more empty tote(s) 232 to be delivered to a picking workstation 236. The retrieved empty tote 232 can then be designated as an order to be filled with eaches of goods from the product totes 232 as designated in customer orders (e.g., at the picking workstations 236).

In accordance with an example embodiment of the present invention, pickers 234 are assigned to the designated picking workstations 236 and are instructed to pull eaches of goods from the totes 232 delivered by the automated mobile robots 122 (e.g., product totes 232) operating in order fulfillment mode. As would be appreciated by one skilled in the art, the pickers 234 can be any combination of manual human and automated opera orations. For example, the picker 234 can be a human who receives input from the system 100 for which instructs which and how many eaches to pull from each delivered product tote 232 and place those eaches into the order tote 232, as depicted in FIG. 6A. In another example, the picker 234 can be an automated articulated arm robot 234 that is configured to transfer ordered sub-totes containing eaches to the empty order tote 232, as depicted in FIG. 6B. Once an order tote 232 has been filled with eaches, an automated mobile robot 122 with receive a task demand to either store the order tote 232 in the storage rack 230 structure, to a temporary storage location within the delivery section 208, shown in FIG. 6C, or transport it directly to a transfer station 242. The remaining steps in the product flow according to the disclosed embodiment involve the fulfillment of customer orders at each-picking workstations 236, and the transfer of completed orders to customers, as described in U.S. patent application Ser. No. 15/171,802 having a filing date of Jun. 2, 2016 and entitled "Storage and Retrieval System" which is hereby incorporated by reference in its entirety.

In accordance with an example embodiment of the present invention, the modes of operation include a consolidation and delivery mode. When the automated mobile robot 122 is designated and operates in the consolidation and delivery mode, the automated mobile robot 122 propels itself through the storage rack 230 structure of the automated fulfillment 204 section, removing totes 232 (e.g., completed order totes 232) from the storage rack 230 structure or a temporarily affixed portable storage rack and transporting those totes 232 to the delivery section 208 for storage at a transfer station 242. In particular, an automated mobile robot 122 receives a task demand to retrieve a designated completed order tote 232 from a designated storage location (e.g., within the storage rack 230) and a task demand to transport the designated completed order tote 232 to either a transfer station 242 for customer pick-up, to temporarily store, or to the consolidation section 240 for consolidation into a delivery bundle. If the task demand requires delivery to the consolidation section 240, a plurality of automated mobile robots 122 will each receive task demands to simultaneously or sequentially retrieve a plurality of completed order totes 232 for delivery to the consolidation section 240. At the consolidation section 240 a merger module will consolidate the eaches of goods from each of the retrieved order totes 232 into a delivery bundle (e.g., a group of order totes). In accordance with an example embodiment of the present invention, the delivery bundle includes one or more totes 232 designated as order totes 232 for delivery.

When the consolidation of a plurality of order totes has been completed, one or more automated mobile robot 122 receive a task demand to transport the totes 232 for the delivery bundle to a designated transfer station 242 within the delivery section 208 for storage and pick-up by a customer. FIGS. 7A and 7B depict two different transfer station configurations for delivery by the automated mobile robots 122. FIG. 7A depicts an exemplary "in store" or cart transfer station 242 configuration. The cart delivery configuration includes rails attached to the storage rack 230 that extend adjacent to one or more specialized delivery carts. The delivery carts are designed such that the automated mobile robots 122 can transfer the delivered order tote 232 to the cart from the storage rack 230 attached rails, as depicted in FIG. 7A.

FIG. 7B depicts an exemplary example of a "curb side" or customer car transfer station 242 configuration. Similar to the structure in FIG. 7A, the customer car transfer station 242 configuration includes rails attached to the storage rack 230 that extend adjacent to one or more specialized temporary customer storage racks. The temporary customer storage racks are designed such that the automated mobile robots 122 can transfer the delivered order tote 232 to the temporary customer storage racks from the storage rack 230 attached rails, as depicted in FIG. 7B. Additionally, the temporary customer storage racks are configured adjacent to customer parking spaces, such that the customers can pull up to the designated locations and pick-up their respective orders from the temporary customer storage racks. As would be appreciated by one skilled in the art, if only a single order tote 232 retrieved from the storage rack 230 is designated for delivery, the consolidation step is skipped and the retrieving automated mobile robot 122 can transport the order tote 232 directly to a designated transfer station 242 within the delivery section 208.

In accordance with an example embodiment of the present invention, the modes of operation for each of the automated mobile robots 122, and the task demands associated therewith, are determined at least in part based on a time of day. In particular, the time of day influences which and how many of the plurality of automated mobile robots 122 are allocated within each mode of operation and which task demands are transmitted to the automated mobile robots 122 during that mode of operation in such a way that the time of day acts as a basis for designation of the mobile robot of the order fulfillment mode, the replenishment mode, defragmentation mode, or the delivery mode. The mode of operations and task demands are determined by the central controller 116 are based on a combination of factors. The factors can include but are not limited to a relative quantity of tasks to be completed in each of the automated fulfillment section 204, the replenishment section 206, the delivery section 208 and the shopping section 202, an indication of the customer arriving to pick up an order at the delivery fulfillment section 208 (e.g., a transfer station 242), a relative quantity of tasks to be completed in each of the automated fulfillment section 204, the replenishment section 206, the delivery section 208 and the shopping section 202 as well as an applied weighting giving a higher priority to delivering delivery bundles tasks versus a replenishment task.

Additionally, a larger portion of the automated mobile robots 122 are allocated for particular modes of operation during day time "operating hours" (e.g., picking eaches/order, delivering to delivery/pick-up locations, etc.) vs night "stocking hours" (receiving inventory, replenishment, defragmentation, etc.). For example, the system 100 can direct a larger ratio of the automated mobile robots 122 to order fulfillment tasks and delivery tasks relative to other tasks during peak operating hours of the automated store 200. Similarly, the system 100 can direct a larger ratio of the automated mobile robots 122 to replenishment tasks, relative to other tasks, during off-peak operating hours. As would be appreciated by one skilled art, the allocation of operation modes for the automated mobile robots 122 can include any combination of modes based on demands of the automated store 200, number of available automated mobile robots 122, and other factors for optimization/efficiency.

Figure 8:
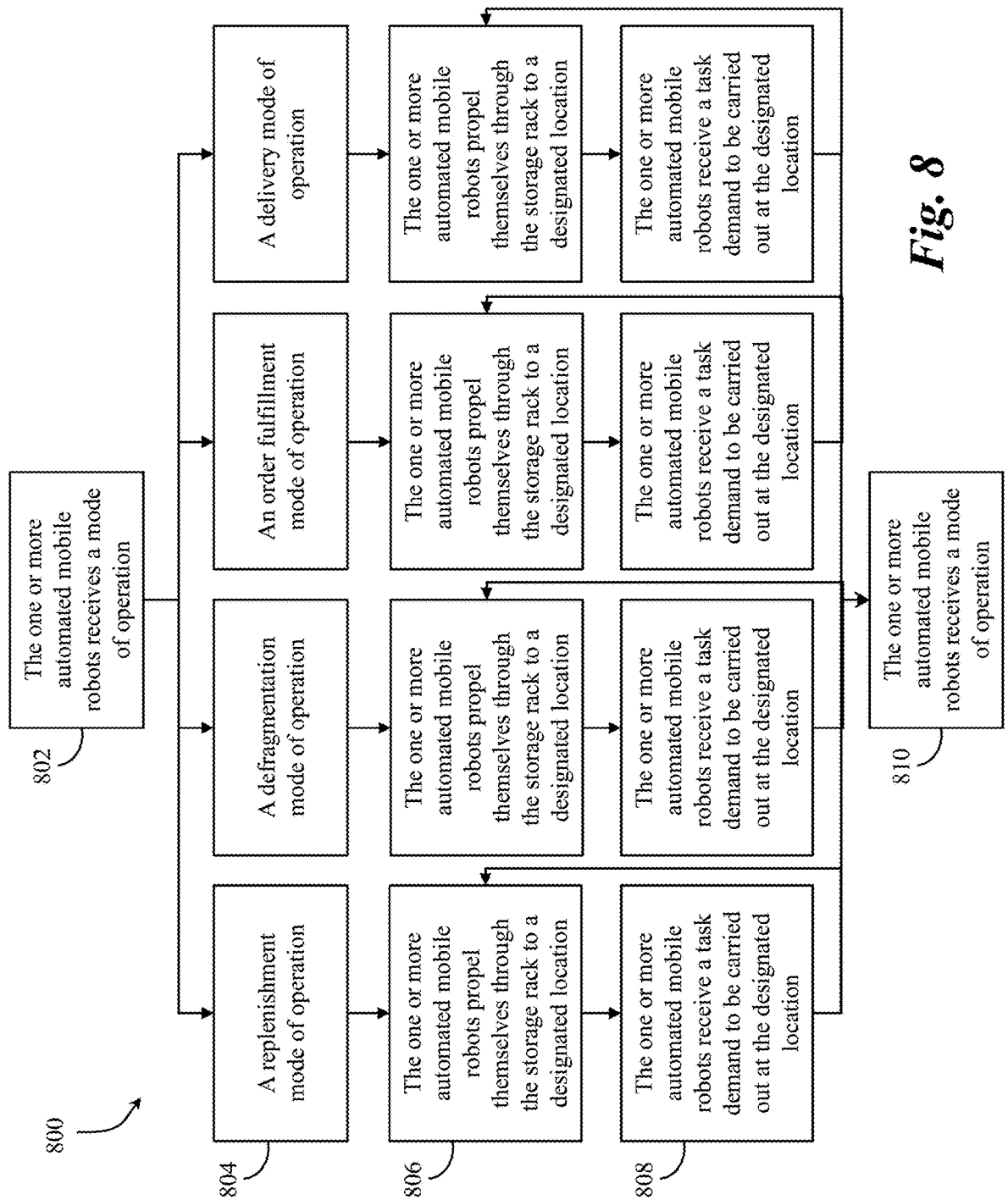
FIG. 8 is an illustrative flowchart depicting modes of operation within an automated mobile robot storage and retrieval system.

FIG. 8 show exemplary flow charts depicting implementation of the system and method of the present invention. Specifically, FIG. 8 depicts an exemplary flow chart showing the implementation of the different modes of operation for the automated mobile robots 122, as discussed with respect to FIGS. 1-7B. In particular, FIG. 8 depicts a process 800 for how the functionalities of the automated mobile robots 122 will change based on the mode of operation allocated to those automated mobile robots 122. At step 802, the one or more mobile robots receive a mode of operation from the system 102. At step 804, the mode is identified and the automated mobile robots 122 implement the mode of operation. At step 808, the automated mobile robots 122 receive specific task demand for a location for the automated mobile robots 122 to travel to, to perform the next task. At step 808, the automated mobile robots 122 receive specific task demands associated with the mode of operation. In particular, the task demands include a location of a tote 232 to retrieve, a location to deliver the tote 232, and what to do with the tote 232 at the location. The steps 806 and 808 will repeat until the mode of operation is completed or a new mode of operation is assigned at step 810.

Figure 9:
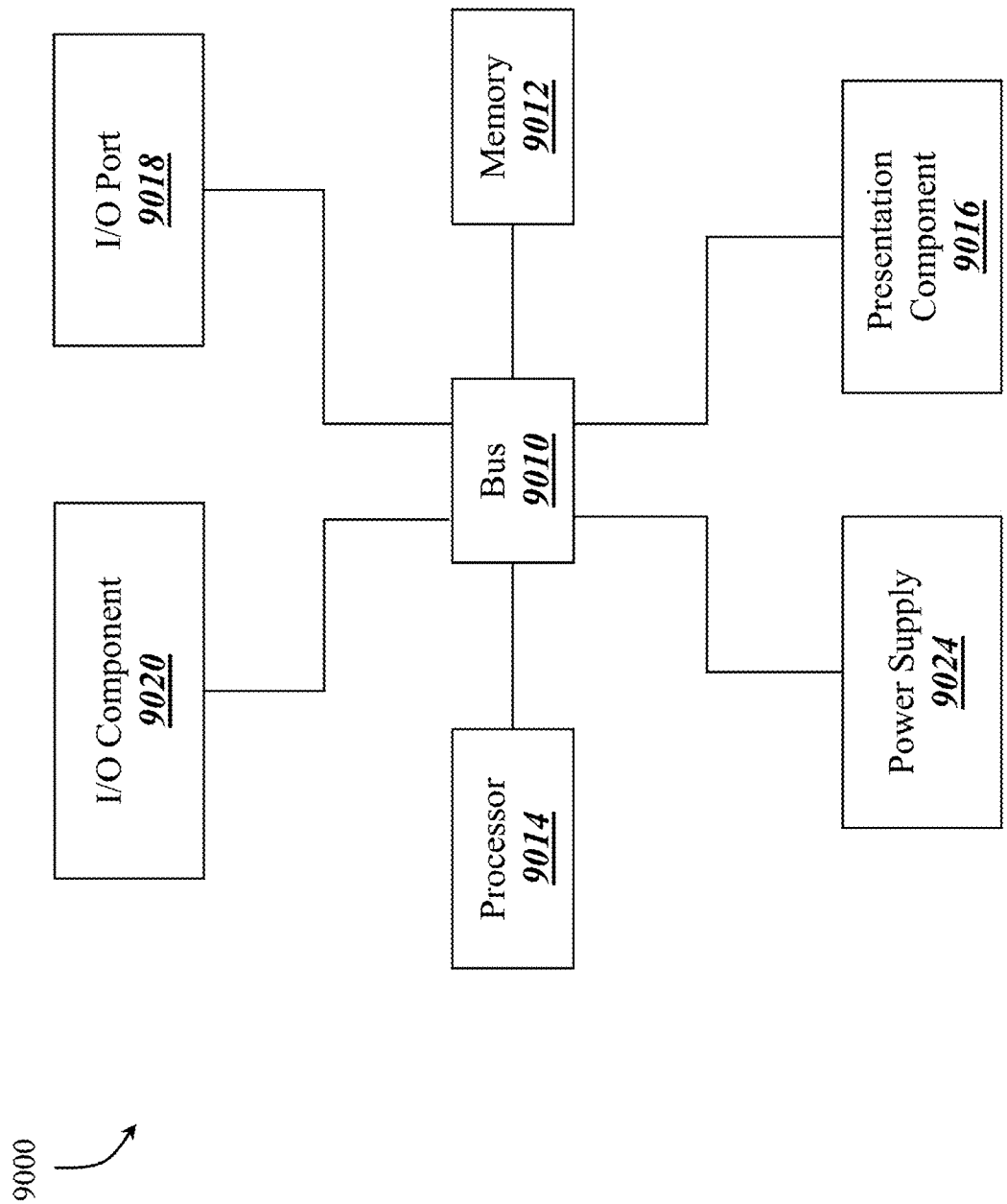
FIG. 9 is a diagrammatic illustration of a high level architecture for implementing processes described herein.

Any suitable computing device can be used to implement the computing devices 104, 124, 122 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 9000 is depicted in FIG. 9. The computing device 9000 is merely an illustrative example of a suitable computing environment and in no way limits the scope of the present invention. A "computing device," as represented by FIG. 9, can include a "workstation," a "server," a "laptop," a "desktop," a "hand-held device," a "mobile device," a "tablet computer," or other computing devices, as would be understood by those of skill in the art. Given that the computing device 9000 is depicted for illustrative purposes, embodiments of the present invention may utilize any number of computing devices 9000 in any number of different ways to implement a single embodiment of the present invention. Accordingly, embodiments of the present invention are not limited to a single computing device 9000, as would be appreciated by one with skill in the art, nor are they limited to a single type of implementation or configuration of the example computing device 9000.

The computing device 9000 can include a bus 9010 that can be coupled to one or more of the following illustrative components, directly or indirectly: a memory 9012, one or more processors 9014, one or more presentation components 9016, input/output ports 9018, input/output components 9020, and a power supply 9024. One of skill in the art will appreciate that the bus 9010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 9 is merely illustrative of an exemplary computing device that can be used to implement one or more embodiments of the present invention, and in no way limits the invention.

The computing device 9000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 9000.

The memory 9012 can include computer-storage media in the form of volatile and/or nonvolatile memory. The memory 9012 may be removable, non-removable, or any combination thereof. Exemplary hardware devices are devices such as hard drives, solid-state memory, optical-disc drives, and the like. The computing device 9000 can include one or more processors that read data from components such as the memory 9012, the various I/O components 9016, etc. Presentation component(s) 9016 present data indications to a user or other device. Exemplary presentation components include a display device, speaker, printing component, vibrating component, etc.

The I/O ports 9018 can enable the computing device 9000 to be logically coupled to other devices, such as I/O components 9020. Some of the I/O components 9020 can be built into the computing device 9000. Examples of such I/O components 9020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Further, the terms "robot" and "bot" are utilized interchangeably herein in accordance with their conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

Unless otherwise noted or defined herein, to the extent directional vocabulary is utilized, the disclosure and figures are described with reference to a conventional three-dimensional coordinate axis system of X, Y and Z, where the X direction is generally left-right or east-west, the Y direction is generally in-out, relative to the plane of the page of the document, and the Z direction is generally up-down or north-south on the page. Further as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb-bob hangs in response to the force of gravity. The direction of horizontal is considered along a line or plane that is normal or orthogonal to the vertical plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). Merging the X, Y, Z coordinate access with the terms vertical and horizontal, the Z-axis lies in the vertical direction and the X and Y axes lie in the horizontal plane with the vertical Z axis being orthogonal thereto. To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. An automated store, comprising:
   a building structure comprising:
      a replenishment section wherein the automated store is replenished with product totes containing new inventory eaches;
      an automated fulfillment section wherein eaches are transferred from product totes to order totes at workstations to fulfill orders from customers; and
      a delivery section wherein order totes from the automated fulfillment section are made available for direct pickup by the customers or a customer proxy; and
   a mobile robot configured to move throughout and between the replenishment section, the automated fulfillment section and the delivery section;
   a central controller configured to:
   assign a mode of operation from a plurality of modes of operation to the mobile robot, the plurality of modes of operation comprising a replenishment mode, an order fulfillment mode and a delivery mode,
   wherein, in the replenishment mode, the mobile robot transports received product totes into storage;
   wherein, in the order fulfillment mode, the mobile robot transports the product totes to the workstations, and transports the order totes to the workstations and the delivery section;
   wherein, in the delivery mode, the mobile robot transports order totes to a location in the delivery section to make the order totes available for delivery to the customers or customer proxy; and
   wherein the mobile robot may travel between each of the replenishment section, the automated fulfillment section and the delivery section without physical reconfiguration of the mobile robot.

2. The automated store of claim 1, the plurality of modes of operation further comprising a defragmentation mode, wherein, in the defragmentation mode, the central controller configures the mobile robot to position product totes at a defragmentation station to consolidate eaches into fewer product totes for storage in the storage locations.

3. The automated store of claim 2, wherein, when the mobile robot is in the defragmentation mode, the mobile robot delivers product totes to the defragmentation station for one or more sub-totes to be re-arranged within the product totes.

4. The automated store of claim 3, wherein empty sub-totes are consolidated into a subset of one or more product totes.

5. The automated store of claim 4, wherein the defragmentation mode further comprises removing totes containing empty sub-totes to increase storage density.

6. The automated store of claim 1, wherein the automated fulfillment section comprises a storage rack structure having a plurality of rack modules separated by aisles and having a plurality of storage levels, the storage rack structure storing a plurality totes comprising product totes, order totes and/or empty totes.

7. The automated store of claim 6, wherein, when the central controller designates the mobile robot to operate in the order fulfillment mode, the mobile robot propels itself through the storage rack structure of the automated fulfillment section, placing totes into the storage rack structure, removing totes from the storage rack structure, and transporting totes.

8. The automated store of claim 1, wherein the central controller is further configured to receive input regarding task priority, the task priority designating which of the plurality of modes of operation for the mobile robot is currently to be prioritized over others of the plurality of modes of operation.

9. The automated store of claim 8, wherein the task priority is determined at least in part based on a time of day in such a way that the time of day acts as a basis for designation of the mobile robot of the order fulfillment mode, the replenishment mode, or the delivery mode.

10. The automated store of claim 8, wherein the task priority is determined at least in part based on a relative quantity of tasks to be completed in each of the order fulfillment mode, the replenishment mode, or the delivery.

11. The automated store of claim 8, wherein the task priority is determined at least in part based on an indication of the customer arriving to pick up an order.

12. The automated store of claim 11, wherein, upon receipt of a customer order, the central controller sets the mode of operation of the mobile robot to order fulfillment mode based on the task priority where the eaches for the customer have yet to be placed in an order tote.

13. The automated store of claim 11, wherein, upon the indication of the customer arriving, the central controller sets the mode of operation of the mobile robot to delivery mode based on the task priority where the eaches for the customer have been placed in an order tote.

14. The automated store of claim 8, wherein the task priority is determined at least in part based on relative quantity of tasks to be completed in the automated fulfillment section as well as an applied weighting giving higher priority to delivery of completed order totes to the location within the delivery section.

15. The automated store of claim 8, wherein the task priority is determined by a priority which prioritizes the delivery of order totes in the delivery mode over operations in the order fulfillment mode and replenishment mode.

16. The automated store of claim 15, wherein the task priority is determined by a priority which prioritizes the operations in the order fulfillment mode over operations in the replenishment mode.

17. The automated store of claim 16, wherein the task priority is determined by a priority which prioritizes the operations in the replenishment mode over operations in a defragmentation mode, wherein, in the defragmentation mode, the mobile robot is configured to position product totes at a defragmentation station to consolidate eaches into fewer product totes for storage in the storage locations.

18. The automated store of claim 1, wherein the product totes are stocked with the new inventory eaches before the product totes arrive at the automated store.

19. The automated store of claim 1, wherein the product totes stocked the new inventory eaches in the replenishment section.

20. The automated store of claim 1, wherein the delivery section is curbside.

21. An automated store, comprising:
a building structure comprising:
a replenishment section wherein the automated store is replenished with product totes containing new inventory eaches;
an automated fulfillment section wherein eaches are transferred from product totes to order totes at workstations to fulfill orders from customers;
a delivery section wherein order totes from the automated fulfillment section are made available for direct pickup by the customers or a customer proxy;
a plurality of mobile robots, each mobile robot of the plurality of mobile robots configured to move throughout, and perform functions within, each of the replenishment section, the automated fulfillment section and the delivery section; and
a central controller configured to:
receive input regarding task priority, and
assign a mode of operation from the plurality of modes of operation to the mobile robot based on the task priority, the plurality of modes of operation comprising a replenishment mode, an order fulfillment mode and a delivery mode;
wherein the mobile robot may travel between each of the replenishment section, the automated fulfillment section and the delivery section without physical reconfiguration of the mobile robot.

22. The automated store of claim 21, the automated fulfillment section further configured for defragmentation of the product totes by consolidating eaches into fewer product totes for storage in the storage locations, the mobile robot further configured to perform functions enabling the defragmentation of the product totes.

23. The automated store of claim 21, the building structure further comprising a shopping section comprising non-fungible goods for selection by the customers, non-fungible goods selected by customers delivered to a transfer station.

24. The automated store of claim 23, wherein the mobile robot is further configured to retrieve non-fungible goods from the transfer station and to deliver the non-fungible goods to the delivery section for delivery to the customers.

25. The automated store of claim 23, wherein the mobile robot is further configured to retrieve non-fungible goods from the transfer station and to bring the non-fungible goods to a location where non-fungible goods for a customer may be added to an order tote with eaches for that customer.

26. The automated store of claim 21, wherein the functions of the mobile robot are determined by a priority which prioritizes the delivery of order totes to the delivery section over functions in the automated fulfillment section and replenishment section.

27. The automated store of claim 26, wherein the functions of the mobile robot are determined by a priority which prioritizes the function in the automated fulfillment section over functions in the replenishment section.

28. The automated store of claim 27, wherein the functions of the mobile robot are determined by a priority which prioritizes the functions in the replenishment section over functions related to defragmentation of the product totes, wherein defragmentation of the product totes comprises consolidating eaches into fewer product totes for storage in the storage locations.

29. The automated store of claim 21, wherein the delivery section is curbside.

30. The automated store of claim 21, wherein a majority of the plurality of mobile robots are allocated for operation within the automated fulfillment section during day time operating hours, and a majority of the plurality of mobile robots are allocated for operation within the replenishment section during night time hours outside of the operating hours.

* * * * *